United States Patent [19]

Karayannis et al.

[11] 4,277,370

[45] Jul. 7, 1981

[54] ALPHA-OLEFIN POLYMERIZATION CATALYST

[75] Inventors: Nicholas M. Karayannis, Naperville; John S. Skryantz, Lisle, both of Ill.

[73] Assignee: Standard Oil Company (Indiana), Chicago, Ill.

[21] Appl. No.: 113,543

[22] Filed: Jan. 21, 1980

Related U.S. Application Data

[63] Continuation-in-part of Ser. No. 14,891, Feb. 15, 1979, abandoned.

[51] Int. Cl.³ ............................................. C08F 4/64
[52] U.S. Cl. ........................... 252/429 B; 252/431 R; 252/431 C; 252/431 N; 252/431 P; 526/124
[58] Field of Search ........... 252/429 B, 431 R, 431 C, 252/431 N, 431 P

[56] References Cited

U.S. PATENT DOCUMENTS

| | | | |
|---|---|---|---|
| 2,956,993 | 10/1960 | Nowlin et al. | 252/429 C X |
| 3,718,636 | 2/1973 | Stevens et al. | 252/429 C X |
| 3,840,470 | 10/1974 | Ligorati et al. | 252/429 C |
| 3,883,492 | 5/1975 | Delbouille et al. | 252/429 C X |
| 3,888,835 | 6/1975 | Ito et al. | 252/429 B X |
| 3,901,863 | 8/1975 | Berger et al. | 252/429 C X |
| 3,950,268 | 4/1976 | Karayannis et al. | 252/429 B |
| 3,953,414 | 4/1976 | Galli et al. | 252/429 B X |
| 3,989,878 | 11/1976 | Aishima et al. | 252/429 B X |
| 3,989,879 | 11/1976 | Berger et al. | 252/429 B X |
| 4,004,071 | 1/1977 | Aishima et al. | 252/429 C X |
| 4,027,088 | 5/1977 | Matsuura et al. | 252/429 C X |
| 4,069,169 | 1/1978 | Toyoda et al. | 252/429 B |
| 4,072,809 | 2/1978 | Rogan | 252/429 B X |
| 4,076,924 | 2/1978 | Toyota et al. | 252/429 B X |
| 4,088,812 | 5/1978 | Matuura et al. | 252/429 C X |
| 4,111,835 | 9/1978 | Foschini et al. | 252/429 B X |
| 4,115,319 | 9/1978 | Scata et al. | 252/429 B |
| 4,149,990 | 4/1979 | Giannini et al. | 252/429 B |
| 4,159,963 | 7/1979 | Sakurai et al. | 252/429 B |
| 4,159,965 | 7/1979 | Sakurai et al. | 252/429 B |
| 4,171,284 | 10/1979 | Balint | 252/429 B |

FOREIGN PATENT DOCUMENTS

| | | |
|---|---|---|
| 2656055 | 6/1977 | Fed. Rep. of Germany . |
| 2701647 | 7/1977 | Fed. Rep. of Germany . |
| 2729196 | 1/1978 | Fed. Rep. of Germany . |
| 52073991 | 6/1977 | Japan . |
| 5298076 | 8/1977 | Japan . |
| 5330493 | 3/1978 | Japan . |
| 160280 | 5/1979 | Netherlands . |
| 1309987 | 3/1973 | United Kingdom . |
| 1456464 | 11/1976 | United Kingdom . |
| 1538472 | 1/1979 | United Kingdom . |
| 1539175 | 1/1979 | United Kingdom . |
| 1559194 | 1/1980 | United Kingdom . |

*Primary Examiner*—Patrick Garvin
*Attorney, Agent, or Firm*—Stephen L. Hensley; William T. McClain; William H. Magidson

[57] ABSTRACT

Catalyst for the stereospecific polymerization of alpha-olefins of 3 or more carbon atoms comprising an organoaluminum compound and a component prepared from halogen-containing compound of titanium(IV), organic electron donor, and a pretreatment product of components comprising magnesium alcoholate, Group II or IIIA metal alkyl, and optionally, one or more pretreatment modifiers such as a mineral acid or anhydride of sulfur, organometallic chalcogenide derivative of hydrogen sulfide, organic acid or organic acid ester. Preferably, the product obtained from such materials is contacted with liquid Lewis acid and mechanically activated prior to polymerization use.

79 Claims, No Drawings

ALPHA-OLEFIN POLYMERIZATION CATALYST

This is a continuation-in-part of our copending application Ser. No. 14,891, filed Feb. 15, 1979, now abandoned.

This invention relates to catalysts for the stereospecific polymerization of alpha-olefins of at least 3 carbon atoms. More particularly, the invention relates to highly active catalysts comprising (A) an organoaluminum component and (B) a stereospecific supported component prepared from (1) at least one halogen-containing compound of tetravalent titanium, (2) at least one organic electron donor, and (3) at least one magnesium-containing pretreatment product of components comprising (a) at least one magnesium alcoholate, (b) at least one metal alkyl compound of a metal of Group II or IIIA of the Periodic Table, and optionally, (c) at least one modifier component selected from the group consisting of mineral acids and anhydrides of sulfur, organometallic chalcogenide derivatives of hydrogen sulfide, organic acids and organic esters. The Periodic Table referred to herein is that appearing in *Handbook of Chemistry and Physics*, 50th ed., Chemical Rubber Company (1969).

It is well known that normally solid, high molecular weight, predominantly crystalline polymers of alpha-olefins such as ethylene, propylene, butene-1, etc. can be prepared using catalysts comprising an organoaluminum compound and a transition metal compound. Among such catalysts, those wherein the transition metal compound is supported on a catalytically inert material such as a metal oxide or salt have been found particularly advantageous in the polymerization of ethylene and copolymerization of ethylene-dominated mixtures of alpha-olefins. See e.g., U.S. Pat. No. 3,901,863. Typically, such catalysts exhibit higher activities, give higher polymer yields, and make more efficient use of transition metal compounds than do catalysts containing unsupported transition metal compounds. Until recently, however, supported transition metal catalyst components have found little or no commercial use in the stereospecific polymerization of alpha-olefins of three or more carbon atoms due to the production of objectionably high levels of commercially undesirable, stereorandom polymeric products, such as amorphous and low molecular weight components, during polymerization. Although the alkane solubility of such stereorandom products affords a convenient means for removal thereof from the commercially desirable, alkane-insoluble, isotactic polymeric products, the economic advantages of the newer vapor phase and bulk polymerization systems are substantially lost unless commercially useful products can be produced without substantial removal of stereorandom by-products. Even in slurry polymerization systems, wherein by-product removal typically is facilitated by the use of an alkane polymerization medium, removal adds cost to the process and the recovered by-products, being of little commercial value, typically are discarded.

In recent years, various attempts have been made to provide stereospecific supported transition metal catalyst components so that the activity and yield-related advantages attained through the use of supported catalysts in polymerization of ethylene can be exploited in the stereospecific polymerization of alpha-olefins of three or more carbon atoms. One approach has been to conduct the polymerization in the presence of an organoaluminum compound, a supported transition metal component of the type conventionally used in the polymerization of ethylene, and one or more compounds of the type conventionally used as crystallinity promoting modifiers for unsupported titanium trichloride-based catalysts. While the use of such crystallinity promoters has led to some improvement in stereospecificity, levels of stereorandom by-products typically have not been reduced below about 25 wt.%, and often are as high as 50 wt.% or more. These levels are well in excess of the amounts that can be tolerated in a commercially useful product.

A more successful approach to providing stereospecific supported transition metal catalyst components has been to build stereospecificity into the components themselves. The prior art has reported a number of catalyst components of this type, and that levels of stereorandom by-products (solubles and extractables) as low as about 5 to 10 wt.% have been achieved through the use of certain of these catalyst components, typically in conjunction with one or more crystallinity promoters. For purposes hereof, by-product levels determined by extraction with a specified solvent are referred to as "extractables" and by-product levels determined by measuring the residue remaining after evaporation of polymerization medium to dryness are referred to as "solubles." The following proposals may be considered relevant to the present invention.

West German Offen. No. 2,701,647, to Mitsui Petrochemical Ind., discloses catalysts comprising an organoaluminum compound and a stereospecific supported component prepared by reacting titanium tetrachloride with (1) the product obtained by copulverizing a halogen-containing magnesium compound with an organoaluminum or organogermanium compound and an organic acid ester; or (2) the product obtained by copulverizing the magnesium and aluminum or germanium compounds and then contacting the result with the organic acid ester without pulverization. In the examples it is reported that the products prepared by polymerizing propylene in the presence of the disclosed catalysts and a crystallinity promoting modifier contained 3 to 6 wt.% boiling n-heptane extractables and another 3 to 5 wt.% solubles. Similarly, West German Offen. No. 2,656,055, to Mitsui Petrochemicals Ind., discloses that products containing 2 to 7 wt.% boiling n-heptane extractables and about 1 to 4 wt.% solubles were obtained by polymerizing propylene in the presence of stereospecific supported components prepared by reacting a titanium compound with the product obtained by copulverizing a halogen-containing magnesium compound with an organic electron donor and then reacting the copulverized product with an organometallic compound of a Group I-III metal. The reaction with the titanium compound is carried out without pulverization.

U.S. Pat. No. 4,076,924, to Toyota et al. discloses stereospecific supported catalyst components prepared by reacting a tetravalent titanium compound with the product obtained by reacting a magnesium dihalide, an alcohol, an organic acid ester, and an organometallic compound of a Group I-III metal. The examples of this patent disclose that polymerization of propylene in the presence of catalysts containing such supported components resulted in products containing about 3 to 6 wt.% boiling n-heptane extractables and another 1 to 3 wt.% solubles. British Pat. No. 1,456,464, to Mitsui Petrochemical Ind., discloses supported catalyst components prepared by reacting a titanium or vanadium compound with the product obtained by reacting an organoaluminum compound, an alcohol, and a magnesium dihalide concurrently or by reacting the aluminum compound with either the alcohol or the magnesium compound and then reacting the result with the remaining component. Catalysts containing the disclosed supported components are useful primarily in the polymerization of ethylene. It is not disclosed whether such components are useful in the stereospecific polymerization of propylene and higher alpha-olefins.

While the above-described patents disclose various titanium compounds, metal alkyls, and modifier components of the type employed according to the present invention, and reaction of such titanium compounds with products prepared from a magnesium compound, a metal alkyl, and modifiers, there is no suggestion to carry out this reaction in the presence of an organic electron donor. Further, none of the patents suggests the use of magnesium alcoholates in preparation of stereospecific supported catalyst components. In the polymerization of alpha-olefins, the above-described supported components are disadvantageous because polymeric products prepared in the presence of catalyst components prepared from halogen-containing magnesium compounds often contain high levels of halogen which, in turn, can adversely affect polymer properties. Those of the disclosed catalyst components which are prepared by copulverization of starting materials are disadvantageous for the additional reason that copulverization of starting materials typically is time-consuming and adds cost to the preparation.

West German Offen. No. 2,729,196, to Mitsui Petrochemical Ind., discloses stereospecific supported catalyst components prepared from a magnesium compound of the formula $Mg(OR)_n(OR')_{n-2}$ wherein R and R' are identical or different alkyl or aryl radicals and n ranges from 0 to 2; an organic electron donor; and a titanium(IV) halide, alkoxide, or alkoxyhalide. The supported component is prepared by copulverizing the magnesium compound and electron donor and then reacting the result with the titanium compound, although it also is stated that the sequence in which these materials are brought together to form the catalyst component is not critical. The materials are employed in amounts such that the supported component contains at least 6 moles of chlorine per mole of titanium and at least 0.1 mole of organic electron donor per mole of titanium. It is disclosed that polymerization of propylene in the presence of catalysts containing the disclosed supported components resulted in products containing about 3 to 6 wt.% n-heptane extractables and about 2 to 5 wt.% hexane solubles. Similarly Japanese Kokai No. 52-98076, to Mitsubishi, discloses stereospecific supported components prepared from a magnesium alkoxide or aryloxide, a titanium tetrahalide, an organic electron donor, and optionally, a halogenated silane. The supported component is prepared by a variety of techniques, each of which involves contacting the magnesium compound with the electron donor and/or the silane by mechanical grinding or in an inert, liquid hydrocarbon followed by reacting the result with the titanium compound or an adduct thereof with the electron donor, again by grinding or in an inert hydrocarbon. The examples of this patent illustrate that polymerization of propylene in the presence of catalysts containing the disclosed supported components gave products containing about 20 to 30 wt.% boiling n-heptane extractables. Solubles are not reported.

U.S. Pat. No. 4,069,169, to Toyoda et al., discloses stereospecific supported catalyst components prepared by reacting a titanium(IV) halide with the product obtained by copulverizing various combinations of a magnesium dihalide, an adduct thereof with an organic acid ester, an organic acid ester, a titanium(IV) halide, alkoxide, aryloxide, alkoxyhalide or aryloxyhalide, and adducts thereof with an organic acid ester. The reaction with the titanium(IV) halide is conducted without mechanical pulverization. According to the examples of this patent, polymerization of propylene in the presence of catalysts containing the disclosed supported components gave products containing about 4 to 9 wt.% boiling n-heptane extractables and about 3 to 7 wt.% solubles. Japanese Kokai No. 30493/78, to Mitsubishi Chemical Ind., discloses catalyst components prepared by supporting a titanium compound on a solid magnesium-containing material prepared by contacting a magnesium dihalide, an alcohol or amine, and a halogenated carboxylic or sulfonic acid.

While certain of the above-described proposals disclose the use of titanium and magnesium compounds, and certain modifier components and organic electron donors of the type employed according to the present invention and reacting titanium compounds with the product obtained by contacting certain magnesium compounds and modifiers or organic electron donors or combinations thereof, there is no suggestion to employ a metal alkyl compound in preparation of the magnesium-containing products nor is it disclosed to react such magnesium-containing products with a titanium compound and an organic electron donor.

U.S. Pat. No. 4,027,088, to Matsuura et al. discloses catalyst components prepared by supporting a titanium or vanadium compound on the product obtained by contacting an oxide, double oxide, or hydroxide of magnesium and/or calcium with sulfur dioxide. Similarly, U.S. Pat. No. 4,088,812, to Matsuura et al., discloses titanium or vanadium compounds supported on oxides or double oxides of the Group II-IV metals which have been contacted with sulfur trioxide. Although these patents disclose the use of certain sulfur-containing compounds of the type employed as modifier components according to the present invention and reaction of titanium compounds with the product obtained by contacting a magnesium compound with such sulfur containing compounds, the patents fail to disclose either the type of magnesium compounds employed according to the present invention or the use of a metal alkyl component during contacting of the magnesium and sulfur compounds. Further, there is no suggestion to prepare a catalyst component by reaction of the sulfur oxide-treated magnesium compounds with a titanium compound and organic electron donor. Moreover, it is not disclosed that the catalyst components of these patents are useful in the stereospecific polymerization of alpha-olefins containing at least 3 carbon atoms.

In view of the foregoing, it can be appreciated that it would be desirable to provide stereospecific supported catalyst components and catalysts based thereon which are improved in terms of stereospecificity, activity, preparative ease, and in other respects. It is an object of this invention to provide an improved stereospecific supported catalyst component and catalysts based thereon. A further object of the invention is to provide a method for the preparation of such catalyst components. A further object of the invention is to provide for the stereospecific polymerization of alpha-olefins having at least three carbon atoms in the presence of such catalysts. Another object of the invention is to provide catalysts useful in the stereospecific polymerization of alpha-olefins of 3 or more carbon atoms to highly crystalline polyalpha-olefin products in sufficiently high yields relative to the amount of catalyst employed, and with sufficiently low levels of stereorandom by-products, that useful products can be obtained without the need for separation of such by-products and catalyst residues. Other objects of the invention will be apparent to persons of skill in the art from the following description and the appended claims.

It has now been found that the foregoing objects can be attained according to this invention wherein there are provided stereospecific supported catalyst components comprising the solid reaction product of components comprising (1) at least one halogen-containing compound of titanium(IV); (2) at least one organic electron donor; and (3) at least one hydrocarbon-insoluble, magnesium-containing pretreatment product of components comprising (a) at least one magnesium alcoholate, (b) at least one Group II or IIIA metal alkyl, and optionally, (c) at least one modifier selected from the group consisting of mineral acids and anhydrides of sulfur, organometallic chalcogenide derivatives of hydrogen sulfide, organic acids and esters thereof. Preferably, the reaction product of such components is contacted with liquid Lewis acid and mechanically activated prior to use. Advantageously, there is no need for costly and time-consuming copulverization of the materials employed in catalyst component preparation, although mechanical activation of the final catalyst component, such as by ball milling, often leads to increases in catalytic activity and contributes to improved stereospecificity. Additionally, the invented catalyst components offer advantages in terms of shelf-life in that prolonged storage of the components does not substantially alter polymerization performance. The catalysts of this invention, comprising the above-described stereospecific supported components and an organoaluminum component, give highly desirable results when employed in the stereospecific polymerization of alpha-olefins of three or more carbon atoms in that catalytic activity and polymer isotacticity are sufficiently high that useful products are obtained without the need for separation of catalyst residues and stereorandom by-products. Levels of halogen contained in such polymeric products are advantageously low due to the use of halogen-free magnesium compounds in preparation of the invented catalyst components. Additionally, the bulk density of such polymeric products is sufficiently high that handling and processing are facilitated.

Although the precise mechanism by which the invented catalyst components are formed is presently unknown, it appears that both pretreatment and the presence of organic electron donor during reaction of the pretreatment product with the titanium(IV) compound contribute significantly to the highly desirable polymerization performance of the invented catalyst components. Other things being equal, the catalysts of this invention are more active and stereospecific than catalysts containing supported components prepared by reaction of halogen-containing compounds of titanium-(IV) and pretreatment product but without the use of organic electron donor component. Likewise, the invented catalysts are superior to those wherein the supported components are prepared by reacting halogen-containing titanium(IV) compound with organic electron donor and magnesium alcoholate rather than a magnesium-containing pretreatment product. The invented catalysts also are substantially more stereospecific than those prepared in like manner except using magnesium dihalides instead of magnesium alcoholates in preparation of the magnesium-containing pretreatment product. This finding was unexpected in view of the various successful catalyst components prepared from magnesium halides as described hereinabove.

DESCRIPTION OF THE INVENTION

Briefly, the stereospecific supported catalyst component of this invention comprises the solid reaction product of components comprising (1) at least one halogen-containing compound of titanium(IV); (2) at least one organic electron donor; and (3) at least one hydrocarbon-insoluble, magnesium-containing pretreatment product of components comprising (a) at least one magnesium alcoholate, (b) at least one Group II or IIIA metal alkyl and, optionally, (c) at least one pretreatment modifier selected from the group consisting of mineral acids and anhydrides of sulfur, organometallic chalcogenide derivatives of hydrogen sulfide, organic acids and organic acid esters. For purposes hereof, "pretreatment product" is defined as a product which is essentially free of incompletely reacted Group II or IIIA metal alkyl. Preferably, the reaction product of such components is contacted with liquid Lewis acid and then mechanically activated prior to polymerization use.

In somewhat greater detail, the magnesium-containing pretreatment product, (3), employed according to this invention is obtained by contacting components comprising (a) at least one magnesium alcoholate of the formula $Mg(OR^1)_n(OR^2)_{2-n}$ wherein $R^1$ and $R^2$ are identical or different hydrocarbyl radicals of 1 to about 20 carbon atoms and n ranges from 0 to 2; and (b) at least one Group II or IIIA metal alkyl containing 1 to about 20 carbon atoms per alkyl radical. Preferably, to maximize the activity of the invented catalysts, the pretreatment components further comprise (c) at least one modifier selected from the group consisting of mineral acids and anhydrides of sulfur, organometallic chalcogenide derivatives of hydrogen sulfide, organic acids and esters thereof.

Specific examples of magnesium alcoholates which are useful according to this invention include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, and $Mg(OC_{16}H_{33})(OC_{18}H_{37})$. Mixtures of magnesium alcoholates also can be employed if desired. Additionally, although not preferred, mixtures of magnesium alcoholates with minor amounts of other suitable metal salts such as alcoholates of lanthanum and the lanthanide metals, magnesium halides, hydroxyhalides, carboxylates, and so forth can be used.

From the standpoint of cost and availability, magnesium alcoholates which are preferred for use according to this invention are those of the formula $Mg(OR^1)_2$ wherein $R^1$ is as defined above. In terms of catalytic activity and stereospecificity, best results are achieved through the use of magnesium alcoholates of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms. Best results are attained through the use of magnesium ethoxide.

Useful Group II and IIIA metal alkyls are compounds of the formula $MR^3{}_m$ wherein M is a Group II or IIIA metal, each $R^3$ is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, $R^3$, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum.

Modifiers useful as pretreatment components are mineral acids and anhydrides of sulfur, organometallic chalcogenide derivatives of hydrogen sulfide, organic acids, organic acid esters, and mixtures thereof.

Specific examples of useful mineral acids and anhydrides of sulfur include sulfur dioxide, sulfur trioxide, sulfuric acid, fuming sulfuric acid, and halosulfonic acids such as chlorosulfonic and fluorosulfonic acids. Hydrogen sulfide, which behaves as a weak acid in aqueous solution, also is considered a mineral acid of sulfur for purposes hereof. Also contemplated are the organometallic chalcogenide derivatives of hydrogen sulfide in which each hydrogen is replaced by an organosilicon, organogermanium, or organotin group wherein the organic radicals are selected from the group consisting of phenyl, alkyl-substituted phenyl, phenyl-substituted alkyl, and alkyl radicals, such alkyl radicals containing 1 to about 6 carbon atoms. Specific examples of useful organometallic chalcogenide pretreatment modifiers include bis(triphenyltin)sulfide, bis(tritolyltin)sulfide, bis(triethylphenyltin)sulfide, bis(trihexylphenyltin)sulfide, bis(triphenylmethyltin)sulfide, bis(triphenylethyltin)sulfide, bis(triphenylhexyltin)sulfide, bis(trimethyltin)sulfide, bis(triethyltin)sulfide, bis(tributyltin)sulfide, bis(trihexyltin)sulfide, and similar silicon- and germanium-containing compounds.

Among the mineral acids and anhydrides of sulfur and organometallic chalcogenide derivatives, sulfuric acid, fuming sulfuric acid, chlorosulfonic acid, and hydrogen sulfide are preferred because they lead to the best overall improvements in activities and stereospecificities.

Organic acids useful as pretreatment components according to this invention are acids containing from 1 to about 20 carbon atoms and 1 to about 4 carboxyl groups. Such acids include aliphatic acids of 1 to about 20 carbon atoms; halogen-, hydroxyl-, oxo-, alkyl-, alkoxy-, aryl-, and/or aryloxy-substituted aliphatic acids of 1 to about 20 carbon atoms; aromatic acids of 7 to about 14 carbon atoms; and halogen-, hydroxyl-, alkyl-, alkoxy-, aryl-, and/or aryloxy-substituted aromatic acids of 7 to about 20 carbon atoms. Monocarboxylic acids are preferred over the polycarboxylic acids.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acids, veratric acid, asaronic acid, ethoxybenzoic acids, piperonylic acids, vanillic acid, cresotic acid, and everninic acid.

Organic acid esters useful as pretreatment components according to this invention include alkyl and haloalkyl esters of acids such as are described above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chloroethyl, bromoethyl, butyl, hexyl, cyclohexyl, octyl, chlorododecyl, phenyl, chlorophenyl, and naphthyl esters of acids such as are named above.

Preferred organic acids and esters are benzoic acid, halobenzoic acids and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use.

Mixtures of pretreatment modifiers which are preferred according to this invention are combinations of at least one of the above-described mineral acids or anhydrides of sulfur or organometallic chalcogenide derivatives with at least one of the above-described organic acids or organic acid esters. More preferred combinations are those containing at least one of the preferred sulfur-containing modifiers identified above (i.e., sulfuric acid, fuming sulfuric acid, chlorosulfonic acid, and hydrogen sulfide) and at least one of the preferred organic acids and esters identified above (i.e., benzoic acid, halobenzoic acids, and the $C_1$ to about $C_6$ alkyl esters thereof). Best results are obtained through the use of a combination of chlorosulfonic acid and methyl benzoate.

The magnesium-containing pretreatment product employed in preparation of the invented catalyst components is obtained by contacting components comprising at least one magnesium alcoholate and at least one Group II or IIIA metal alkyl. Preferably, at least one of the above-described pretreatment modifiers also is employed in preparation of the pretreatment product. The components are employed in amounts such that the atomic ratio of metal in the Group II or IIIA metal alkyl component to metal in the magnesium alcoholate component ranges from about 0.001:1 to about 1:1. Preferably, this ratio ranges from about 0.005:1 to about 0.5:1 as these amounts provide for good improvements in catalyst performance without hindering removal of unreacted Group II or IIIA metal alkyl from the reaction product which ultimately forms. In the preferred embodiment of this invention, wherein at least one pretreatment modifier is employed in preparation of the pretreatment product, the modifier is employed in an amount which is effective to improve catalyst component performance but not so great as to hinder pretreatment due to formation of excessive amounts of solids on reaction with the Group II or IIIA metal alkyl pretreatment component. Preferably, this amount ranges from about 0.001 to about 2 moles of pretreatment modifier per mole of Group II or IIIA metal alkyl component. Best results are attained when the molar ratio of pretreatment modifier to metal alkyl component ranges from about 0.005:1 to about 1:1, and particularly from about 0.01:1 to about 0.5:1. According to a particularly preferred embodiment of the invention wherein the modifier component employed is a mixture of at least one mineral acid or anhydride of sulfur or organometallic chalcogenide derivative and at least one organic acid or ester, it is preferred to employ from about 0.5 to about 20 moles of the organic acid or ester per mole of sulfur-containing modifier. More preferably, this ratio ranges from about 1:1 to about 15:1.

As indicated above, the pretreatment product employed according to this invention is free of unreacted Group II or IIIA metal alkyl and is prepared by contacting the pretreatment components. Although not required, it is preferred to contact the components in the presence of an inert diluent to aid in conductance of heat evolved on reaction of the magnesium alcoholate and metal alkyl components away from the reaction product and further, because in the absence of a diluent the magnesium alcoholate and metal alkyl components typically react to form a sticky mass which can be difficult to handle in subsequent preparative manipulations. Although it is preferred to contact the pretreatment components in the presence of an inert diluent, other techniques such as pulverization of magnesium alcoholate in the presence of metal alkyl and, optionally, modifier component or a fluidized bed treatment of solid magnesium alcoholate with Group II or IIIA metal alkyl, and optionally, one or more modifiers, also can be employed. Most preferably, Group II or IIIA metal alkyl in the form of a solution in an inert diluent is added to a suspension of magnesium alcoholate in a diluent. Modifier components, when used, can be employed in any convenient form.

Diluents suitable for use in pretreatment include hydrocarbons and halogenated derivatives thereof that are substantially inert to the pretreatment components employed and, preferably, are liquid at pretreatment temperatures; although it also is contemplated to conduct the pretreatment at elevated pressure so that lower-boiling diluents can be used even at higher temperatures. Examples of useful diluents include alkanes such as hexane, cyclohexane, ethylcyclohexane, heptane, octane, nonane, decane, undecane, and so forth; aromatics such as xylenes and ethylbenzene; and halogenated and hydrogenated aromatics such as chlorobenzene, o-dichlorobenzene, tetrahydronaphthalene, and decahydronaphthalene. Preferred diluents are the alkanes and especially hexane.

The sequence in which the pretreatment components are contacted is not critical. When pretreatment is carried out without the use of pretreatment modifier, the magnesium alcoholate and Group II or IIIA metal alkyl components are simply combined. When one or more modifier components are employed, magnesium alcoholate component, Group II or IIIA metal alkyl component, and modifier component can be contacted concurrently or two of the components can be brought together and then the third component added to the result. Best results are attained when the modifier component is added to a solution of Group II or IIIA metal alkyl component in a diluent and then the resulting solution is added to the magnesium alcoholate component.

Pretreatment according to this invention is carried out at temperatures ranging from about $-30°$ to about $130°$ C. Preferably, the pretreatment temperature ranges from about $0°$ to about $60°$ C., with about $10°$ to about $30°$ C. being more preferred from the standpoint of convenience. The time of pretreatment generally ranges from several minutes to several hours, with about 1 to about 10 hours being preferred. When pretreatment is conducted in the presence of an inert diluent, it is desirable to agitate the components during pretreatment to ensure thorough contacting of the components.

Following contacting of pretreatment components as described above, unreacted Group II or IIIA metal alkyl component is removed from the reaction product of the pretreatment components to avoid reduction of the titanium component employed in subsequent preparative steps. When pretreatment is conducted in the presence of an inert diluent, the reaction product preferably is separated from the diluent, for example, by filtration or decantation, and unreacted Group II or IIIA metal alkyl is removed therefrom by washing with hexane or another alkane.

The above-described pretreatment is conducted in the substantial absence of water, oxygen, carbon oxides, and other extraneous materials capable of adversely affecting the performance of the invented catalyst components. Such materials are conveniently excluded by carrying out the pretreatment in the presence of an inert gas such as nitrogen or argon, or by other suitable means. It also is contemplated to conduct all or part of the pretreatment in the presence of one or more alpha-olefins which, when introduced into the preparative system in gaseous form, can serve to exclude catalyst poisons. The presence of one or more alpha-olefins during pretreatment also can result in improved stereospecificity. Useful alpha-olefins include ethylene, propylene, butene-1, pentene-1, 4-methylpentene-1, hexene-1, and mixtures thereof. Of course, any alphaolefin employed during pretreatment should be of relatively high purity, for example, polymerization grade or higher. Other precautions which aid in excluding extraneous poisons include purification of any diluent to be employed, such as by percolation through molecular sieves and/or silica gel prior to use, and drying and/or heating of magnesium alcoholate pretreatment components.

As a result of the pretreatment in accordance with this invention, there is obtained a hydrocarbon-in-soluble, magnesium-containing pretreatment product which can be reacted with at least one halogen-containing titanium(IV) compound and at least one organic electron donor to form a stereospecific supported catalyst component useful in the stereospecific polymerization of alpha-olefins of 3 or more carbon atoms.

Titanium(IV) compounds useful in preparation of the stereospecific supported catalyst components of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly $TiCl_4$ are most preferred from the standpoint of attaining maximum activity and stereospecificity.

Organic electron donors useful in preparation of the stereospecific supported catalyst components of this invention are organic compounds containing oxygen, nitrogen, sulfur, and/or phosphorus. Such compounds include organic acids, organic acid esters, alcohols, ethers, aldehydes, ketones, amines, amine oxides, amides, thiols, various phosphorus acid esters and amides, and the like. Mixtures of organic electron donors can be employed if desired.

Specific examples of useful oxygen-containing electron donors include the organic acids and esters employed as pretreatment modifiers as described above, aliphatic alcohols such as methanol, ethanol, propanols, butanols, pentanols, hexanols, and so forth, aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetrahydroxybenzenes, naphthols, and dihydroxynaphthalenes; aralkyl alcohols such as benzyl alcohol, phenylethanols, phenylpropanols, phenylbutanols, phenylpentanols, phenylhexanols, and so forth; alkaryl alcohols such as cresols, xylenols, ethylphenols, propylphenols, butylphenols, pentylphenols, hexylphenols, and so forth; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetole, propylphenyl ether, butylphenyl ether, pentylphenyl ether, hexylphenyl ether and so forth; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propionaldehyde, butyraldehyde, valeraldehyde, caproaldehyde, and so forth, benzylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and so forth, cyclobutanone, cyclopentanone, and cyclohexanone, acetophenone, propiophenone, butyrophenone, valerophenone, caprophenone, and so forth, and diphenyl ketone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, tetraethylputrescine, diphenylmethylamine, triphenylamine, tritolylamine, diphenylbenzylamine, triphenylethylamine, triethylphenylamine, bis(diethylamino)benzenes, and the like; saturated heterocyclic amines and derivatives thereof such as pyrrolidine, piperidine, 2-methylpyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur containing organic electron donors include thiols such as methanethiol, ethanethiol, ethanedithiol, propanethiols, butanethiols, butanedithiols, hexanethiols, and the like; thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more of oxygen, nitrogen, sulfur, and phosphorus include amides such as acetamide, butyramide, caproamide, benzamide, and the like, aminoalcohols such as ethanolamine, hydroxyanilines, aminocresols, and the like; amine oxides such as lutidine-N-oxides and collidine-N-oxides; aminoethers such as bis(2-ethoxyethyl)amine; thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like; various phosphorus acid derivatives such as trimethyl phosphite, tri-n-propyl phosphite, triphenyl phosphite, triethyl trithiophosphite, hexamethylphosphoric triamide, and the like; and phosphine oxides such as triethylphosphine oxide, triphenylphosphine oxide, and the like.

From the standpoint of catalyst performance and preparative ease, the organic electron donors which are preferred according to this invention are $C_1$–$C_6$ alkyl esters of aromatic monocarboxylic acids and halogen-, hydroxyl-, oxo-, alkyl, alkoxy-, aryl-, and/or aryloxy-substituted aromatic monocarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate are particularly preferred. Best results are attained through the use of ethyl benzoate.

In preparation of the stereospecific supported catalyst components of this invention, the magnesium-containing pretreatment product, titanium(IV) component, and organic electron donor component are contacted in amounts such that the atomic ratio of titanium to metal in the magnesium alcoholate component employed in pretreatment is at least about 0.5:1. Preferably, this ratio ranges from about 0.5:1 to about 20:1. Greater amounts of titanium can be employed without adversely affecting catalyst component performance, but there typically is no need to exceed a titanium to magnesium ratio of about 20:1 as only a portion of the titanium is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

The sequence in which the components are contacted is not critical. Suitably, pretreatment product, titanium-(IV) component, and electron donor component are contacted concurrently or two of the components are contacted followed by addition of the remaining component. From the standpoint of catalyst performance and preparative ease, the preferred preparative sequence is to combine the pretreatment product and titanium(IV) component and then add the organic electron donor component to the result.

According to the invention, the pretreatment product, titanium(IV), and electron donor components preferably are contacted in the presence of an inert hydrocarbon or halogenated hydrocarbon diluent, although other suitable techniques can be employed. Suitable diluents are materials which are substantially inert to the components employed and are liquid at the temperatures employed or can be maintained in the liquid state through the use of elevated pressure. As in the case of the diluents employed in pretreatment, it is desirable to purify any diluent to be employed to remove water, oxygen, carbon oxides, and other extraneous catalyst poisons. Examples of suitable diluents include materials such as are identified above as suitable pretreatment diluents, with nonane being preferred.

Reaction between the pretreatment product, titanium component, and organic electron donor is carried out at temperatures ranging from about 50° to about 170° C. Best results are obtained at about 130° to about 160° C. Generally the reaction is carried out over a period of several minutes to several hours, with about ½ to about 10 hours giving good results at economical rates. Most preferably, the reaction time ranges from about 1 to about 5 hours. When the components employed in preparation of the invented catalyst components are contacted according to the preferred preparative sequence, best results are attained when the pretreatment product and titanium(IV) component are combined at about ambient temperature followed by addition of electron donor, at about ambient temperature and with agitation, over about ¼ to about 1½ hours and then heating at about 130° to about 160° C. for about ½ to about 3 hours with continued agitation.

Due to the sensitivity of the invented catalyst components to catalyst poisons such as water, oxygen, and carbon oxides, the catalyst components are prepared in the substantial absence of such materials. Catalyst poisons can be conveniently excluded by carrying out the preparation under an atmosphere of an inert gas such as nitrogen or argon, or an atmosphere of alpha-olefin as described hereinabove. As noted above, purification of any diluent to be employed also aids in removing poisons from the preparative system.

As a result of the above-described preparation there is obtained a solid reaction product suitable for use as a catalyst component. Prior to such use, it is desirable to remove incompletely reacted starting materials from the solid reaction product. This is conveniently accomplished by washing the solid, after separation from any preparative diluent, with a suitable solvent, preferably within a short time after completion of the preparative reaction because prolonged contact between the catalyst component and unreacted starting materials may adversely affect catalyst component performance.

Although the above-described reaction product is suitable for polymerization use, it is preferred to contact the reaction product with at least one liquid Lewis acid or mechanically activate the reaction product or the Lewis acid-treated reaction product. Most preferably, the solid reaction product prepared as described hereinabove is contacted with at least one liquid Lewis acid and then mechanically activated prior to polymerization use in order to obtain the best combination of activity and stereospecificity.

Lewis acids useful according to this invention are materials that are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$, best results being attained with $TiCl_4$ and $SiCl_4$, and especially the former. Mixtures of Lewis acids can be employed if desired.

Prior to contacting with Lewis acid it is contemplated to wash the above-described solid reaction product with inert liquid hydrocarbon or halogenated hydrocarbon although this is not required nor does it materially affect catalyst component performance. Suitable inert liquids include those identified hereinabove as pretreatment and preparative diluents. If such a wash is conducted it is preferred to substantially remove the inert liquid prior to contacting the washed solid with Lewis acid.

The liquid Lewis acid employed according to the invention preferably is used neat although it also is contemplated to employ liquid Lewis acid diluted with up to about 40 vol.% of an inert solvent therefor. Suitable solvents include those materials useful as diluents in preparation of pretreatment product and supported catalyst component as described hereinabove. Of course, any such solvent should be purified prior to use. The amount of Lewis acid used, whether neat or diluted, is not critical. From a practical standpoint, however, the amount should be great enough to provide a high degree of contact between the solid and liquid but not so great as to waste the Lewis acid or require excessively large vessels for the contacting. Most preferably, from about 3 to about 10 ml. Lewis acid are used for each gram of solid to be treated.

Temperature in the liquid Lewis acid-contacting step is at least high enough to avoid solidification of the Lewis acid employed but not so high as to adversely affect ultimate catalyst component performance. Preferred temperatures range from about 0° to about 170°

C. When TiCl$_4$ is used as the Lewis acid, temperatures of about 20° to about 135° C. are preferred as the same result in desirable improvements in catalytic performance while avoiding waste of TiCl$_4$ through vaporization thereof and exposure of catalyst components to conditions more severe than necessary.

The time of contact with liquid Lewis acid is not critical and generally ranges from several minutes to several hours. It is desirable to agitate the solid and Lewis acid during at least a substantial portion of this time to ensure a high degree of contact. Preferred contact times range from 1 to about 30 minutes as the same yield the desired improvements without occupying preparation equipment for undesirably lengthy periods of time.

As in preparation of the solid reaction product, the Lewis acid contacting step according to this invention is conducted in the substantial absence of oxygen, water, carbon oxides and extraneous catalyst poisons. Such materials are excluded by any convenient manner as described hereinabove.

Following contacting with Lewis acid, solids are allowed to settle and supernatant is removed therefrom such as by filtration or decantation. One or more additional Lewis acid-contacting steps can be carried out with the same or different Lewis acid. In addition, a series of alternating Lewis acid and inert liquid hydrocarbon or halogenated hydrocarbon washes can be conducted if desired.

Prior to use in the polymerization of alpha-olefins, it is desirable to mechanically activate the invented catalyst components. Mechanical activation improves the polymerization performance of the invented catalyst components, whether or not treated with Lewis acid, in terms of both activity and susceptibility to modification by crystallinity promoting modifiers. The preferred technique for mechanically activating the invented catalyst components is dry ball-milling, that is, ball-milling in the absence of inert diluent. However, good results also can be obtained by ball-milling in the presence of a minor amount of an inert diluent such as hexane or another alkane, as well as by other techniques. It also is contemplated to mechanically activate the invented catalyst components in the presence of one or more organic electron donors of the general type employed in preparation of the catalyst components. Optimum mechanical activation techniques and conditions can be determined by persons of skill in the art on the basis of the examples appearing hereinafter.

Optimum polymerization is attained by treating with Lewis acid and then mechanically activating. Treatment of mechanically activated catalyst component with Lewis acid is not preferred as it may result in agglomeration of the component and inferior polymerization performance.

Although the chemical structure of the invented catalyst components is not presently known, the components preferably contain from about 1 to about 5 wt.% titanium, from about 10 to about 25 wt.% magnesium, less than about 1 wt.% Group II or IIIA metal and from about 45 to about 65 wt.% halogen. From the standpoint of attaining maximum efficiency of titanium, catalyst components which are more preferred according to this invention contain from about 1.5 to about 3 wt.% titanium, from about 15 to about 20 wt.% magnesium, less than about 0.5 wt.% Group II or IIIA metal, and from about 50 to about 60 wt.% chlorine. The mechanism by which Lewis acid treatment and mechanical activation improve component performance also is unknown although the former results in removal of poorly affixed compounds from the surface of the component, and accordingly, reduced titanium content as compared to untreated components.

The catalysts of this invention comprise a stereospecific supported component as described above, and at least one organoaluminum activator. Preferably, the invented catalysts further comprise one or more crystallinity promoters capable of further improving catalyst stereospecificity. Suitable organoaluminum activators include trihydrocarbylaluminum compounds and dihydrocarbylaluminum hydrides having 1 to 20 carbon atoms per hydrocarbyl radical. Specific examples of useful organoaluminum compounds include Al(CH$_3$)$_3$, Al(C$_2$H$_5$)$_3$, Al(C$_3$H$_7$)$_3$, Al(C$_4$H$_9$)$_3$, Al(C$_5$H$_{11}$)$_3$, Al(C$_6$H$_{13}$)$_3$, Al(C$_8$H$_{17}$)$_3$, Al(C$_{12}$H$_{25}$)$_3$, Al(CH$_3$)$_2$H, Al(C$_2$H$_5$)$_2$H, Al(C$_3$H$_7$)$_2$H, Al(C$_4$H$_9$)$_2$H, Al(C$_5$H$_{11}$)$_2$H, Al(C$_6$H$_{13}$)$_2$H, Al(C$_8$H$_{17}$)$_2$H, and Al(C$_{12}$H$_{25}$)$_2$H. Mixtures also can be employed if desired. Preferred organoaluminum compounds are the trialkylaluminums containing 2 to about 6 carbon atoms per alkyl radical as these lead to best results in terms of activity and stereospecificity. Most preferably, the organoaluminum compound is triethylaluminum, triisobutylaluminum or a mixture thereof. The organoaluminum compound is employed in at least an amount which is effective to promote the polymerization activity of the supported component. Preferably the molar ratio of organoaluminum component to titanium in the supported component is at least about 3:1. More preferably, this ratio ranges from about 5:1 to about 300:1, although substantially greater amounts of organoaluminum component also can be employed and often give highly desirable results.

Useful crystallinity promoters are materials capable of further improving the stereospecificity of the invented catalysts and include a wide variety of materials and combinations of materials. Examples of useful materials include a variety of organic electron donors, such as those employed in preparation of the invented, stereospecific supported catalyst components, and various inorganic mineral acids, anhydrides, and derivatives, including those employed in pretreatment as described hereinabove. The particular materials or combination to be employed can be readily determined by persons of skill in the art and the examples appearing hereinafter illustrate the use of various crystallinity promoters. Preferred materials are those capable of improving stereospecificity without leading to substantial decreases in activity. Examples of preferred crystallinity promoters include ethyl benzoate, ethyl-p-anisate, ethyl pivalate, 2,2,6,6-tetramethylpiperidine, 2-benzylpyridine, 2-acetylpyridine, and combinations thereof.

The above-described catalysts are useful in the stereospecific polymerization of alpha-olefins of 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry, bulk, and vapor phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure, at the polymerization temperature, of the alpha-olefin to be polymerized.

The polymerization time is not critical and will generally range from about ½ to several hours in batch processes. Polymerization times ranging from about 1 to about 4 hours are typical in autoclave type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well known diluents. It often is desirable to purify the polymerization medium prior to use such as by distillation, percolation through molecular sieves, contacting with a compound such as an alkylaluminum compound capable of removing trace impurities, or by other suitable means.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Upon completion of polymerization, or when it is desired to terminate polymerization or deactivate the catalysts of this invention, the catalysts can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high, relative to the amount of catalyst employed, that useful products can be obtained without separation of catalyst residues. Further, levels of stereorandom by-products are sufficiently low that useful products can be obtained without separation thereof. The polymeric products produced in the presence of the invented catalysts can be fabricated into useful articles by extrusion, injection molding, and other common techniques.

The following examples illustrate the present invention and are not to be construed as limiting the scope thereof.

EXAMPLE 1

(A) Preparation of Pretreatment Product

Into a 1 liter flask equipped with magnetic stirrer and maintained under nitrogen in a drybox were added 100 ml. dry n-hexane and 11.4 g. anhydrous magnesium ethoxide (obtained from Dynamit Nobel) at ambient temperature. The resulting suspension was stirred and 10 ml. of a 25 wt. % solution of triethylaluminum (TEA) in dry n-hexane were added dropwise to the stirred suspension over a period of about ¼ hour at ambient temperature. Stirring was continued for 1 hour following completion of the addition of TEA solution and then the solid reaction product was allowed to settle. The supernatant then was decanted and the solid was washed twice with 125 ml. portions of dry n-hexane. The resulting pretreatment product then was suspended in 450 ml. n-nonane. The atomic ratio of aluminum to magnesium employed in preparation of the pretreatment product was 0.15:1.

(B) Preparation of Supported Catalyst Component

Into a 1 liter flask equipped as in (A) were added the suspension of pretreatment product prepared in (A) and 50 ml. titanium tetrachloride at ambient temperature. To the resulting mixture there were added dropwise a solution of 2 ml. ethyl benzoate in 50 ml. n-nonane over a period of about ¼ hour at ambient temperature and with stirring. After addition of the ethyl benzoate solution was completed the resulting mixture was heated to 140°–145° C., stirred at this temperature for 1½ hours, and then allowed to cool to about 115° to 120° C. The supernatant liquid then was decanted and the remaining solid was washed four times with 150 ml. portions of dry n-hexane. After the final wash, the solid was separated from the liquid by filtration and approximately 2 g. thereof was suspended in 100 ml. dry n-hexane. Aliquots of this suspension, identified as 1(B) were employed in the polymerization of propylene as described in (D).

(C) Mechanical Activation of Supported Catalyst Component

A portion of the solid catalyst component prepared in (B) and 90 stainless steel balls having a diameter of 10 mm. were placed in a Roalox, burundum-fortified porcelain mill jar (manufactured by A. Daigger Company) having a capacity of ¼ quart (about 280 ml.) and milled in a rotary ball mill (manufactured by Paul O. Abbe, Inc., motor speed=1725 rpm) for 5 hours at ambient temperature under an atmosphere of dry nitrogen. The solid then was removed from the mill jar, separated from the steel balls, and suspended in 200 ml. dry n-hexane. Aliquots of the suspension, identified as 1(C) were employed in the polymerization of propylene as described in (D).

The atomic ratio of titanium employed in (B) to magnesium employed in (A) was 4.6:1 and the ratio of ethyl benzoate to titanium was 0.03 mole per gram-atom. Elemental analysis revealed that catalyst component 1(C) contained 3.1 wt.% titanium, 16.9 wt.% magnesium, 53.1 wt.% chlorine, and 0.1 wt.% aluminum.

(D) Propylene Polymerization

A series of propylene polymerizations were conducted using aliquots of 1(B) and 1(C) according to the following procedure. Amounts of catalyst component suspension (containing 0.049 g. supported catalyst component in runs using 1(B) and 0.052 g. in runs using 1(C)), TEA (0.15 ml. 25 wt.% in dry n-hexane unless otherwise indicated), and in some runs, various crystallinity promoters (CP) were added to 200 ml. dry n-hexane in a 450 ml. pressure bottle equipped with magnetic stirrer after which the bottle was sealed and placed in a 60° C. oil bath. Polymerization grade propylene then was charged to the bottle at 50 psig. (about 3.52 kg/cm$^2$) and the contents of the bottle were stirred. After 1 hour, the bottle was cooled, opened, and the contents filtered. The resulting white solid polypropylene was dried at ambient temperature and weighed. Hexane solubles were determined by evaporation of the filtrate to dryness and weighing of the residue. Hexane extractables were determined by Soxhlet extraction of a weighed sample of the solid polypropylene with boiling n-hexane. Results are reported in TABLE 1.

TABLE 1

| CATALYST COMPONENT | CP* | ACT** | SOLUBLES (wt. %) | EXTRACTABLES (wt. %) |
|---|---|---|---|---|
| 1(B)*** | — | 1137 | 12.6 | ND**** |
| 1(C)*** | — | 878 | 26.1 | ND |
| 1(B) | (1) | 731 | 1.9 | ND |
| 1(C) | (1) | 702 | 1.4 | ND |
| 1(C)*** | (1) | 304 | 1.1 | 1.8 |
| 1(C) | (1a) | 388 | 1.0 | 2.0 |
| 1(C) | (1b) | 281 | 0.9 | 1.3 |
| 1(B) | (2) | 1247 | 5.1 | ND |
| 1(C) | (2) | 1338 | 4.9 | ND |
| 1(B) | (3) | 986 | 2.8 | ND |
| 1(C) | (3) | 953 | 2.6 | ND |
| 1(C)*** | (3) | 336 | 1.0 | 1.6 |
| 1(C) | (3a) | 701 | 1.7 | 3.3 |
| 1(C) | (3b) | 597 | 1.1 | 2.5 |
| 1(B) | (4) | 1057 | 4.3 | ND |
| 1(C) | (4) | 1145 | 3.7 | ND |
| 1(B) | (5) | 726 | 2.9 | ND |
| 1(C) | (5) | 797 | 2.3 | ND |

*Crystallinity Promoters:
(1) 0.006 ml. ethyl benzoate and 0.003 ml. ethyl p-anisate;
(1a) 0.006 ml. ethyl benzoate and 0.004 ml. ethyl p-anisate;
(1b) 0.008 ml. ethyl benzoate and 0.004 ml. ethyl p-anisate;
(2) 0.006 ml. ethyl benzoate and 0.003 ml. bis(tri-n-butyltin) sulfide;
(3) 0.006 ml. ethyl benzoate and 0.003 ml. 2,2,6,6-tetramethylpiperidine;
(3a) 0.006 ml. ethyl benzoate and 0.004 ml. 2,2,6,6-tetramethylpiperidine;
(3b) 0.008 ml. ethyl benzoate and 0.004 ml. 2,2,6,6-tetramethylpiperidine;
(4) 0.006 ml. ethyl benzoate and 0.003 ml. 2-benzylpyridine;
(5) 0.006 ml. ethyl benzoate and 0.003 ml. 2-acetylpyridine.
**ACT is activity in grams solid polypropylene per gram catalyst component per hour.
***0.10 ml. 25 wt. % TEA in dry n-hexane used in these runs.
****ND stands for not determined.

EXAMPLE 1 and TABLE 1 illustrate preparation of supported catalyst components according to this invention and the use and performance thereof in the stereospecific polymerization of propylene. As can be observed from the table, even in runs carried out without a crystallinity promoter, stereorandom by-product levels were comparable to or lower than the 25–50% levels typical of conventional supported ethylene polymerization catalyst components when used in conjunction with a crystallinity promoter. The use of crystallinity promoters with components 1(B) and 1(C) resulted in substantial decreases in by-product levels and activities were maintained at sufficiently high levels as to eliminate the need for removal of catalyst residues (e.g. about 300 g./g./hour). Mechanical activation led to significant decreases in activity and increases in solubles in runs carried out without the use of a crystallinity promoter. However, comparison of runs wherein a crystallinity promoter was employed reveals that the mechanically activated component (1(C)) was superior in terms of solubles levels and comparable or superior in terms of activity. With respect to the various crystallinity promoters employed, it was not unexpected that the choice and amounts of materials employed would have varying effects on solubles, extractables, and in many cases, activity as well. Despite these variations, it can be observed that in all runs, the use of crystallinity promoters resulted in improved catalyst component performance in terms of activity and/or stereospecificity.

EXAMPLE 2

Steps (A), (B), and (C) of EXAMPLE 1 were repeated except that the TEA solution employed in 1(A) was replaced by 10 ml. of a 10 wt.% solution of n-butylethylmagnesium (MAGALA BEM II obtained from Texas Alkyls) in heptane. The atomic ratio of magnesium supplied by the n-butylethylmagnesium to magnesium supplied by the magnesium ethoxide was 0.07:1. The atomic ratio of titanium to magnesium supplied by the magnesium ethoxide and the ratio of ethyl benzoate to titanium were as in EXAMPLE 1. Aliquots of 2(B) and 2(C) (containing 0.050 g. catalyst component in each run) were employed in the polymerization of propylene according to the procedure of EXAMPLE 1(D). Results are reported in TABLE 2.

EXAMPLE 3

Steps (A), (B), and (C) of EXAMPLE 1 were repeated except that the TEA solution employed in 1(A) was replaced by 10 ml. of a 15 wt.% solution of diethylzinc (obtained from Texas Alkyls) in dry heptane. The atomic ratio of zinc to magnesium was 0.09:1. The atomic ratio of titanium to magnesium and the ratio of ethyl benzoate to titanium were as in EXAMPLE 1. Elemental analysis for titanium, magnesium, and chlorine showed that component 3(C) contained 3.7 wt.% titanium, 16.9 wt.% magnesium, and 53.2 wt.% chlorine. Aliquots of 3(B) and 3(C) (containing 0.050 g. and 0.049 g. catalyst component respectively) were employed in the polymerization of propylene according to the procedure of EXAMPLE 1(D). Results are reported in TABLE 2.

TABLE 2

| CATALYST COMPONENT | CP* | ACT** | SOLUBLES (wt. %) |
|---|---|---|---|
| 2(B)*** | — | 660 | 20.5 |
| 2(C)*** | — | 961 | 20.6 |
| 2(B) | (1) | 392 | 2.6 |
| 2(C) | (1) | 556 | 1.6 |
| 2(C)*** | (1) | 159 | 1.3 |
| 2(C) | (1a) | 440 | 1.4 |
| 2(B) | (2) | 644 | 4.9 |

TABLE 2-continued

| CATALYST COMPONENT | CP* | ACT** | SOLUBLES (wt. %) |
|---|---|---|---|
| 2(C) | (2) | 1114 | 3.9 |
| 2(C) | (2a) | 199 | 1.0 |
| 2(B) | (3) | 520 | 4.0 |
| 2(C) | (3) | 415 | 1.3 |
| 2(C)*** | (3) | 372 | 1.5 |
| 2(C) | (3a) | 780 | 2.5 |
| 2(C) | (3b) | 564 | 1.9 |
| 2(B) | (4) | 622 | 4.2 |
| 2(C) | (4) | 927 | 3.7 |
| 2(B) | (5) | 291 | 2.6 |
| 2(C) | (5) | 451 | 1.7 |
| 3(B)*** | — | 940 | 11.7 |
| 3(C)*** | — | 637 | 24.3 |
| 3(B) | (1) | 611 | 2.3 |
| 3(C) | (1) | 506 | 2.1 |
| 3(B) | (2) | 1101 | 5.3 |
| 3(C) | (2) | 1098 | 4.3 |
| 3(B) | (3) | 898 | 3.2 |
| 3(C) | (3) | 638 | 3.1 |
| 3(B) | (4) | 771 | 3.5 |
| 3(C) | (4) | 601 | 2.4 |
| 3(B) | (5) | 594 | 3.1 |
| 3(C) | (5) | 441 | 2.2 |

*Crystallinity Promoters:
(2a) 0.008 ml. ethyl benzoate and 0.004 ml. bis(tri-n-butyltin)sulfide; all others as in EXAMPLE 1.
**Grams solid polypropylene per gram catalyst component per hour.
***0.10 ml. 25 wt. % TEA in dry n-hexane used in these runs.

EXAMPLES 2 and 3 and TABLE 2 illustrate the preparation and performance of catalyst components prepared from Group II and IIIA metal alkyl pretreatment components other than aluminum alkyls. From the table it can be seen that activities, while somewhat less than those reported in TABLE 1, were high, and stereospecificities were generally comparable to those reported in TABLE 1.

EXAMPLE 4

Steps (A), (B), and (C) of EXAMPLE 1 were repeated except that the TEA solution employed in 1(A) was replaced by 10 ml. of a mixture prepared by combining 60 ml. TEA solution, 0.03 ml. chlorosulfonic acid, and 0.2 ml. methyl benzoate in a 4 oz. glass bottle under nitrogen at ambient temperature with stirring for about ½ hour. In preparation of the pretreatment product, the atomic ratio of aluminum to magnesium was 0.15:1, the molar ratio of pretreatment modifiers (chlorosulfonic acid and methyl benzoate) to TEA was 0.02:1, and the molar ratio of methyl benzoate to chlorosulfonic acid was 3.5:1. In preparation of the supported catalyst component, the atomic ratio of titanium to magnesium employed in pretreatment and the ethyl benzoate to titanium ratio were as in EXAMPLE 1. Catalyst component 4(C) contained 3.1 wt.% titanium, 17.5 wt.% magnesium, 53.9 wt.% chlorine, and 0.1 wt.% aluminum. Aliquots of 4(B) and 4(C), containing 0.049 g. catalyst component in all runs, were employed in the polymerization of propylene according to EXAMPLE 1(D). Results are reported in TABLE 3.

TABLE 3

| CATALYST COMPONENT | CP* | ACT** | SOLUBLES (wt. %) | EXTRACTABLES (wt. %) |
|---|---|---|---|---|
| 4(B)*** | — | 667 | 22.2 | ND**** |
| 4(C)*** | — | 884 | 30.3 | ND |
| 4(B) | (1) | 553 | 1.9 | ND |
| 4(C) | (1) | 859 | 1.6 | 3.1 |
| 4(C)*** | (1) | 360 | 1.1 | 1.4 |
| 4(C) | (1a) | 638 | 1.2 | 1.8 |
| 4(C) | (1b) | 425 | 1.0 | 1.2 |
| 4(B) | (2) | 943 | 6.0 | ND |
| 4(C) | (2) | 1436 | 6.3 | ND |
| 4(B) | (3) | 692 | 3.4 | ND |
| 4(C) | (3) | 1078 | 2.8 | 4.0 |
| 4(C)*** | (3) | 651 | 1.2 | 2.0 |
| 4(C) | (3a) | 971 | 2.4 | 2.9 |
| 4(C) | (3b) | 737 | 1.4 | 1.8 |
| 4(B) | (4) | 876 | 5.0 | ND |
| 4(C) | (4) | 1252 | 3.6 | ND |
| 4(B) | (5) | 691 | 3.5 | ND |
| 4(C) | (5) | 871 | 2.0 | 2.3 |

*Crystallinity Promoters were as in EXAMPLE 1.
**Grams solid polypropylene per gram catalyst component per hour.
***0.10 ml. 25 wt. % TEA in dry n-hexane used in these runs.
****ND stands for not determined.

EXAMPLE 4 and TABLE 3 illustrate supported catalyst components of the type which are preferred according to this invention. Comparison of TABLE 3 and TABLE 1 illustrate that although inclusion of chlorosulfonic acid and methyl benzoate as pretreatment components resulted in supported catalyst components having activities somewhat lower than those of EXAMPLE 1 prior to mechanical activation, activation resulted in improved activities and comparable or improved stereospecificities.

EXAMPLE 5

The procedure of EXAMPLE 4 was repeated except that the TEA-chlorosulfonic acid-methyl benzoate mixture used in 4(A) was replaced by 10 ml. of a mixture prepared by combining 60 ml. TEA solution, 0.03 ml. chlorosulfonic acid and 1 ml. methyl benzoate. Reactant ratios were essentially the same as in EXAMPLE 4 except that the pretreatment modifier to TEA molar ratio was 0.1:1 and the methyl benzoate to chlorosulfonic acid molar ratio was 18.5:1. Aliquots of 5(B) and 5(C) (containing 0.050 g. and 0.052 g. catalyst component respectively) were employed in the polymerization of propylene according to EXAMPLE 1(D). Results are reported in TABLE 4.

TABLE 4

| CATALYST COMPONENT | CP* | ACT** | SOLUBLES (wt. %) |
|---|---|---|---|
| 5(B)*** | — | 750 | 17.5 |
| 5(C)*** | — | 791 | 23.8 |
| 5(B) | (1) | 333 | 2.1 |
| 5(C) | (1) | 709 | 1.7 |
| 5(C)*** | (1) | 288 | 1.2 |
| 5(C) | (1a) | 494 | 1.1 |
| 5(C) | (1b) | 421 | 1.2 |
| 5(B) | (2) | 769 | 5.2 |
| 5(C) | (2) | 1285 | 6.0 |
| 5(B) | (3) | 608 | 3.5 |
| 5(C) | (3) | 969 | 2.4 |
| 5(C)*** | (3) | 508 | 1.4 |
| 5(C) | (3a) | 815 | 2.3 |
| 5(C) | (3b) | 646 | 1.6 |
| 5(B) | (4) | 623 | 4.6 |
| 5(C) | (4) | 1033 | 4.2 |
| 5(B) | (5) | 604 | 4.0 |
| 5(C) | (5) | 764 | 2.4 |

*Crystallinity Promoters were as in EXAMPLE 1.
**Grams solid polypropylene per gram catalyst component per hour.
***0.10 ml. 25 wt. % TEA in dry n-hexane used in these runs.

EXAMPLE 6

The procedure of EXAMPLE 4 was repeated except that the amount of ethyl benzoate employed in (B) was increased to 4.0 ml. Reactant ratios were the same as in EXAMPLE 4 except that the ethyl benzoate to titanium ratio was 0.06:1.0. Catalyst component 6(C) contained 2.5 wt.% titanium, 18.8 wt.% magnesium, and less than 1 wt.% aluminum. Aliquots of 6(B) and 6(C) (containing 0.050 g. catalyst component in all runs) were employed according to the procedure of EXAMPLE 1(D). Results are reported in Table 5.

EXAMPLE 7

The procedure of EXAMPLE 4 was repeated except that the amount of titanium tetrachloride employed in (B) was 100 ml. and the duration of (C) was 22 hours. Reactant ratios were the same as in EXAMPLE 4 except that the titanium to magnesium ratio was 9.2:1 and the ethyl benzoate to titanium ratio was 0.01:1. Aliquots of 7(B) and 7(C) (containing 0.050 g. and 0.049 g. catalyst component respectively) were employed according to the procedure of EXAMPLE 1(D). Results are reported in TABLE 5.

TABLE 5

| CATALYST COMPONENT | CP* | ACT** | SOLUBLES (wt. %) | EXTRACTABLES (wt. %) |
|---|---|---|---|---|
| 6(B)*** | — | 678 | 10.3 | ND******* |
| 6(C)*** | — | 1070 | 8.8 | 4.8 |
| 6(B) | (1) | 349 | 2.4 | ND |
| 6(C) | (1) | 485 | 1.3 | 1.9 |
| 6(B) | (3) | 369 | 2.9 | ND |
| 6(C) | (3) | 626 | 1.3 | 2.5 |
| 6(B) | (5) | 281 | 2.4 | ND |
| 6(C) | (5) | 280 | 1.5 | 1.4 |
| 6(B) | (6) | 368 | 2.7 | ND |
| 6(C) | (6) | 524 | 1.4 | 2.2 |
| 6(B) | (7) | 249 | 1.9 | ND |
| 6(C) | (7) | 344 | 1.3 | 1.8 |
| 7(B)**** | — | 1021 | 14.7 | ND |
| 7(C)*** | — | 950 | 19.3 | ND |
| 7(B)***** | (1) | 692 | 2.2 | ND |
| 7(C) | (1) | 582 | 1.0 | ND |
| 7(B)****** | (3) | 759 | 3.2 | ND |
| 7(C) | (3) | 807 | 1.3 | ND |
| 7(B) | (5) | 793 | 3.9 | ND |
| 7(C) | (5) | 625 | 1.4 | ND |
| 7(B) | (6) | 582 | 2.4 | ND |
| 7(C) | (6) | 572 | 1.1 | ND |
| 7(B) | (7) | 512 | 1.7 | ND |
| 7(C) | (7) | 498 | 1.1 | ND |

*Crystallinity Promoters:
(6) 0.006 ml. ethyl benzoate and 0.003 ml. ethyl pivalate;
(7) 0.006 ml. ethyl benzoate and 0.003 ml. ethyl p-bromobenzoate;
all others were as in EXAMPLE 1.
**Grams solid polypropylene per gram catalyst component per hour.
***0.10 ml. 25 wt. % TEA in dry n-hexane used in these runs.
****0.10 ml. 25 wt. % TEA in dry n-hexane used in this run; polymerization time was 40 minutes.
*****Polymerization time was 45 minutes in this run.
******Polymerization time ws 50 minutes in this run.
*******ND stands for not determined.

EXAMPLE 8

The procedure of EXAMPLE 4 was repeated except that the amount of TEA-chlorosulfonic acid-methyl benzoate mixture used in (A), and the amount of titanium tetrachloride used in (B) were doubled (i.e., 20 ml TEA-chlorosulfonic acid-methyl benzoate mixture, 100 ml. TiCl$_4$), the amount of ethyl benzoate used in (B) was 2.5 ml., and the duration of (C) was 25 hours. Reactant ratios were as in EXAMPLE 4 except that the aluminum to magnesium ratio in (A) was 0.3:1, the titanium to magnesium ratio was 9.2:1, and ethyl benzoate to titanium ratio was 0.02:1. Aliquots of 8(B) and 8(C) (containing 0.050 g. and 0.049 g. catalyst component respectively) were employed according to the procedure of EXAMPLE 1 (D). Results are reported in TABLE 6.

TABLE 6

| CATALYST COMPONENT | CP* | ACT** | SOLUBLES (wt. %) |
|---|---|---|---|
| 8(B)*** | — | 1038 | 11.7 |
| 8(C)*** | — | 1218 | 13.2 |
| 8(B) | (1) | 518 | 1.3 |
| 8(C) | (1) | 624 | 0.8 |
| 8(B) | (3) | 630 | 1.8 |
| 8(C) | (3) | 843 | 1.0 |
| 8(B) | (5) | 448 | 1.8 |
| 8(C) | (5) | 387 | 0.8 |
| 8(B) | (6) | 549 | 1.6 |
| 8(C) | (6) | 725 | 1.0 |
| 8(B) | (7) | 283 | 1.1 |
| 8(C) | (7) | 494 | 0.8 |

*Crystallinity Promoters were as in TABLE 5.
**Grams solid polypropylene per gram catalyst component per hour.
***0.10 ml. 25 wt. % TEA in dry n-hexane used in these runs.

EXAMPLES 5–8 and TABLES 4–6 illustrate the effects of varying the proportions of various components employed in preparation of the invented catalyst components. As illustrated in the tables, polymerization performance was generally comparable or superior to that of catalyst components 4(B) and (C).

EXAMPLES 9–14

A series of supported catalyst components were prepared according to the procedure of EXAMPLE 4 except that the TEA-chlorosulfonic acid-methyl benzoate mixture used in 4(A) was replaced by the following TEA-pretreatment modifier mixtures:

(9) 10 ml. of a mixture prepared by combining 25 ml. TEA solution and 15 ml. hydrogen sulfide in a 450 ml. pressure bottle under nitrogen and stirring for ½ hour at ambient temperature. The molar ratio of hydrogen sulfide to TEA was 0.02:1 and the atomic ratio of aluminum to magnesium was 0.1:1.

(10) 10 ml. of a solution of 0.84 ml. fuming sulfuric acid (27% SO$_3$) in 60 ml. TEA solution. Assuming that the sulfuric acid contains 54% H$_2$S$_2$O$_7$ (27% H$_2$SO$_4$+27% SO$_3$) and 46% H$_2$SO$_4$, the molar ratio of fuming sulfuric acid to TEA was 0.13:1 and the atomic ratio of aluminum to magnesium was 0.15:1.

(11) entire amount of a mixture of 10 ml. TEA solution and 0.1 g. benzoic acid. The molar ratio of benzoic acid to TEA was 0.05:1 and the atomic ratio of aluminum to magnesium was 0.15:1.

(12) entire amount of a mixture of 10 ml. TEA solution and 0.5 g. mucochloric acid. The molar ratio of mucochloric acid to TEA was 0.02:1 and the atomic ratio of aluminum to magnesium was 0.15:1.

(13) 10 ml. of a solution of 0.2 ml. methyl benzoate in 10 ml. TEA solution. The duration of mechanical activation of 12(C) was 22 hours. The molar ratio of methyl benzoate to TEA was 0.11:1 and the atomic ratio of aluminum to magnesium was 0.15:1.

(14) 10 ml. of a solution of 6.2 ml. TEA solution, 3.75 ml. hydrogen sulfide, and 0.05 ml. methyl benzoate in 100 ml. dry hexane. The molar ratio of methyl benzoate to hydrogen sulfide was 2.4:1, the molar ratio of methyl benzoate plus hydrogen sulfide to TEA was 0.66:1, and the atomic ratio of aluminum to magnesium 0.009:1.

Aliquots of 9(B) and (C)–14(B) and (C) were employed in the polymerization of propylene according to the procedure of EXAMPLE 1(D). The amounts of catalyst components used in the polymerizations were as follows: 0.049 g. in all runs with 10(B), 12(C), 14(B), and 14(C); 0.050 g. in all runs with 9(B), 10(C), 11(C), 12(B), and 13(B); and 0.051 g. in all runs with 9(C), 11(B), and 13(C). Results are reported in TABLE 7.

TABLE 7

| CATALYST COMPONENT | CP* | ACT** | SOLUBLES (wt. %) |
|---|---|---|---|
| 9(B)*** | — | 1078 | 16.5 |
| 9(C)*** | — | 894 | 26.4 |
| 9(B) | (1) | 634 | 1.9 |
| 9(C) | (1) | 870 | 1.7 |
| 9(B) | (2) | 1144 | 5.8 |
| 9(C) | (2) | 1410 | 7.2 |
| 9(B) | (3) | 946 | 3.2 |
| 9(C) | (3) | 1146 | 2.7 |
| 9(B) | (4) | 972 | 4.0 |
| 9(C) | (4) | 1155 | 4.1 |
| 9(B) | (5) | 812 | 3.1 |
| 9(C) | (5) | 875 | 2.5 |
| 10(B)*** | — | 877 | 14.0 |
| 10(C)*** | — | 863 | 25.0 |
| 10(B) | (1) | 527 | 1.8 |
| 10(C) | (1) | 691 | 1.5 |
| 10(B) | (2) | 915 | 5.1 |
| 10(C) | (2) | 1200 | 3.4 |
| 10(B) | (3) | 642 | 2.9 |
| 10(C) | (3) | 707 | 1.8 |
| 10(B) | (4) | 617 | 2.3 |
| 10(C) | (4) | 976 | 2.6 |
| 10(B) | (5) | 588 | 2.6 |
| 10(C) | (5) | 668 | 1.9 |
| 11(B)*** | — | 481 | 19.7 |
| 11(C)*** | — | 630 | 23.7 |
| 11(B) | (1) | 203 | 2.6 |
| 11(C) | (1) | 198 | 2.1 |
| 11(B) | (2) | 336 | 3.7 |
| 11(C) | (2) | 691 | 4.4 |
| 11(B) | (3) | 282 | 3.6 |
| 11(C) | (3) | 454 | 2.7 |
| 11(B) | (4) | 322 | 3.9 |
| 11(C) | (4) | 430 | 3.0 |
| 11(B) | (5) | 63 | 2.4 |
| 11(C) | (5) | 204 | 2.6 |
| 12(B)*** | — | 389 | 14.6 |
| 12(C)*** | — | 520 | 19.1 |
| 12(B) | (1) | 218 | 2.6 |
| 12(C) | (1) | 214 | 2.1 |
| 12(B) | (2) | 425 | 5.9 |
| 12(C) | (2) | 377 | 4.0 |
| 12(B) | (3) | 351 | 5.3 |
| 12(C) | (3) | 303 | 3.9 |
| 12(B) | (4) | 332 | 4.1 |
| 12(C) | (4) | 294 | 3.4 |
| 12(B) | (5) | 215 | 3.1 |
| 12(C) | (5) | 171 | 2.4 |
| 13(B)*** | — | 879 | 15.1 |
| 13(C)*** | — | 965 | 25.0 |
| 13(B) | (1) | 442 | 2.5 |
| 13(C) | (1) | 719 | 1.7 |
| 13(B) | (2) | 837 | 7.7 |
| 13(C) | (2) | 1360 | 4.8 |
| 13(B) | (3) | 659 | 4.2 |
| 13(C) | (3) | 967 | 2.7 |
| 13(B) | (4) | 835 | 4.1 |
| 13(C) | (4) | 1141 | 4.5 |
| 13(B) | (5) | 580 | 4.5 |
| 13(C) | (5) | 760 | 2.2 |
| 14(B)*** | — | 939 | 12.2 |
| 14(B) | (1) | 587 | 1.7 |
| 14(C) | (1) | 733 | 1.4 |
| 14(B) | (2) | 1024 | 5.4 |
| 14(C) | (2) | 1253 | 4.9 |
| 14(B) | (3) | 808 | 3.2 |
| 14(C) | (3) | 858 | 2.1 |
| 14(B) | (4) | 789 | 3.0 |
| 14(C) | (4) | 979 | 3.2 |
| 14(B) | (5) | 663 | 2.8 |

TABLE 7-continued

| CATALYST COMPONENT | CP* | ACT** | SOLUBLES (wt. %) |
|---|---|---|---|
| 14(C) | (5) | 673 | 1.9 |

*Crystallinity Promoters were as in EXAMPLE 1.
**Grams solid polypropylene per gram catalyst component per hour.
***0.10 ml. 25 wt. % TEA in dry n-hexane used in these runs.

From the table it can be seen that with the exception of catalyst components 11(B), 11(C), 12(B), and 12(C), the performance of catalyst components prepared from various pretreatment modifiers and combinations thereof was generally comparable to that of the catalyst components prepared in EXAMPLE 4. Results were poor in the 11(B), 11(C), 12(B), and 12(C) runs due to contamination of the hexane employed in preparation of the components.

EXAMPLE 15

The procedure of EXAMPLE 4 was repeated except that in (A) the TEA-chlorosulfonic acid-methyl benzoate mixture and magnesium ethoxide were contacted in the presence of propylene (20 psig. (about 1.4 kg/cm$^2$) pressure maintained within the system for one hour). Elemental analysis of component 15(C) for titanium, magnesium, and chlorine showed 3.5 wt.% titanium, 19.7 wt.% magnesium and 55.0 wt.% chlorine. Aliquots of 15(B) and (C) containing 0.050 g. catalyst component were employed in the polymerization of propylene according to the procedure of EXAMPLE 1(D). Results are reported in TABLE 8.

TABLE 8

| CATALYST COMPONENT | CP* | ACT** | SOLUBLES (wt. %) |
|---|---|---|---|
| 15(B)*** | — | 777 | 20.2 |
| 15(C)*** | — | 1253 | 16.3 |
| 15(B) | (1) | 479 | 2.0 |
| 15(C) | (1) | 628 | 1.2 |
| 15(B) | (2) | 842 | 5.5 |
| 15(C) | (2) | 1211 | 2.4 |
| 15(B) | (3) | 643 | 3.1 |
| 15(C) | (3) | 858 | 1.6 |
| 15(B) | (4) | 711 | 3.3 |
| 15(C) | (4) | 766 | 1.8 |
| 15(B) | (5) | 551 | 2.7 |
| 15(C) | (5) | 586 | 1.5 |

*Crystallinity Promoters were as in EXAMPLE 1.
**Grams solid polypropylene per gram catalyst component per hour.
***0.10 ml. 25 wt. % TEA in dry n-hexane used in these runs.

Comparison of TABLE 8 and TABLE 3 illustrates that conducting pretreatment in the presence of an alphaolefin can lead to improved stereospecificity.

COMPARATIVE EXAMPLES 16–18

For comparative purposes, a series of catalyst components were prepared according to the procedure of EXAMPLE 4 with the following variations:
(16) Step (A) was omitted and the suspension of pretreatment product employed in (B) was replaced by a suspension of 11.4 g. magnesium ethoxide in 500 ml. dry n-nonane.
(17) The TEA-chlorosulfonic acid-methyl benzoate mixture employed according to 4(A) was replaced by 10 ml. of a solution of 0.03 ml. chlorosulfonic acid and 0.2 ml. methyl benzoate in 60 ml. dry hexane. The molar ratio of methyl benzoate to chlorosulfonic acid was 3.5:1.
(18) No ethyl benzoate was employed in step (B) and step (C) was omitted. Elemental analysis for titanium, magnesium, and chlorine showed 21.1 wt.% titanium, 10.7 wt.% magnesium, and 48.2 wt.% chlorine.

Aliquots of the suspensions of catalyst components prepared in EXAMPLES 16-18 were employed in a series of propylene polymerization runs according to the procedure of EXAMPLE 1(D). The amounts of catalyst component employed were as follows: 0.051 g. in runs with 16(B); 0.049 g. in runs with 16(C); and 0.050 g. in runs with 17(B), 17(C), and 18(B). Results are reported in TABLE 9.

TABLE 9

| CATALYST COMPONENT | CP* | ACT** | SOLUBLES (wt. %) |
|---|---|---|---|
| 16(B)*** | — | 794 | 16.8 |
| 16(C)**** | — | 963 | 20.2 |
| 16(B) | (1) | 294 | 2.0 |
| 16(C) | (1) | 308 | 1.5 |
| 16(B) | (2) | 656 | 4.1 |
| 16(C) | (2) | 681 | 3.3 |
| 16(B) | (3) | 456 | 2.7 |
| 16(C) | (3) | 506 | 1.9 |
| 16(B) | (4) | 473 | 3.2 |
| 16(C) | (4) | 544 | 2.6 |
| 16(B) | (5) | 257 | 2.8 |
| 16(C) | (5) | 289 | 2.2 |
| 17(B)*** | — | 245 | 13.7 |
| 17(C)*** | — | 534 | 24.3 |
| 17(B) | (1) | 115 | 3.5 |
| 17(C) | (1) | 289 | 2.7 |
| 17(B) | (2) | 163 | 4.8 |
| 17(C) | (2) | 552 | 5.3 |
| 17(B) | (3) | 160 | 4.4 |
| 17(C) | (3) | 313 | 3.3 |
| 17(B) | (4) | 225 | 5.3 |
| 17(C) | (4) | 454 | 3.6 |
| 17(B) | (5) | 140 | 4.3 |
| 17(C) | (5) | 10 | 2.3 |
| 18(B)*** | — | 29 | 46.2 |
| 18(B) | (1) | 20 | 20.9 |
| 18(B) | (2) | 38 | 38.1 |
| 18(B) | (3) | 14 | 26.0 |
| 18(B) | (4) | 24 | 25.6 |
| 18(B) | (5) | 27 | 24.3 |

*Crystallinity Promoters were as in EXAMPLE 1.
**Grams solid polypropylene per gram catalyst component per hour.
***0.10 ml. 25 wt. % TEA in dry n-hexane used in these runs.
****0.10 ml. 25 wt. % TEA in dry n-hexane used in this run; polymerization time was 50 minutes.

EXAMPLE 16 illustrates preparation of a supported catalyst component without pretreatment. Comparison of TABLE 9 with TABLES 1-8 reveals that catalyst components 16(B) and 16(C) were generally comparable in terms of stereospecificity to the catalyst components of this invention. However, with the exception of the catalyst components prepared in EXAMPLES 11 and 12, wherein contaminated hexane was employed, the invented catalyst components are substantially more active than catalyst components 16(B) and (C). In addition to being more active, the invented catalyst components contain less titanium than the components prepared in EXAMPLE 16, and accordingly, the invented catalyst components are superior in terms of efficiency of use of titanium.

EXAMPLE 17 illustrates a catalyst component prepared without the use of a metal alkyl pretreatment component. As can be seen from the table, both activities and stereospecifities were inferior to those of the invented catalyst components.

EXAMPLE 18 illustrates a catalyst component prepared without the use of organic electron donor during reaction of pretreatment product with titanium tetrachloride. As can be seen from the table, both activity and stereospecificity were very poor. Mechanical activation was omitted in EXAMPLE 18 because the performance of the unactivated component (18(B)) was so poor.

COMPARATIVE EXAMPLES 19 AND 20

For comparative purposes, a series of catalyst components were prepared according to the procedure of EXAMPLE 4 with the following variations:
(19) In step (B), after removal of the supernatant the remaining solid was suspended in 200 ml. dry hexane without washing, and a portion of the suspension, identified as 19(B1) was removed for testing. Two days later, another portion of the suspension was removed, the supernatant removed, the solid washed 4 times with 150 ml. portions of dry hexane and then suspended in 225 ml. dry hexane. This suspension is identified as 19(B2). Step (C) was omitted.
(20) The magnesium ethoxide employed according to 4(A) was replaced by 11.4 g. magnesium dichloride. Step (C) was omitted. The aluminum to magnesium ratio was 0.13:1.

Aliquots of the suspensions of catalyst components prepared in EXAMPLES 19 and 20 were employed in a series of propylene polymerization runs according to the procedure of EXAMPLE 1(D). The amounts of catalyst component used in each run were 0.052 g. with 19(B1), 0.049 g. with 19(B2), and 0.050 g. with 20(B). Results are reported in TABLE 10.

TABLE 10

| CATALYST COMPONENT | CP* | ACT** | SOLUBLES (wt. %) |
|---|---|---|---|
| 19(B1)*** | — | 142 | 22.5 |
| 19(B2)*** | — | 531 | 10.3 |
| 19(B1) | (1) | 40 | 8.8 |
| 19(B2) | (1) | 179 | 1.4 |
| 19(B1) | (2) | 64 | 20.1 |
| 19(B2) | (2) | 388 | 2.1 |
| 19(B1) | (3) | 62 | 12.2 |
| 19(B2) | (3) | 233 | 1.6 |
| 19(B1) | (4) | 53 | 12.6 |
| 19(B2) | (4) | 240 | 1.7 |
| 19(B1) | (5) | 24 | 16.1 |
| 19(B2) | (5) | 79 | 2.0 |
| 20(B)*** | — | 589 | 27.1 |
| 20(B) | (1) | 281 | 9.1 |
| 20(B) | (2) | 455 | 14.1 |
| 20(B) | (3) | 372 | 10.0 |
| 20(B) | (4) | 448 | 13.1 |
| 20(B) | (5) | 276 | 8.4 |

*Crystallinity Promoters were as in EXAMPLE 1.
**Grams solid polypropylene per gram catalyst component per hour.
***0.10 ml. 25 wt. % TEA in dry n-hexane used in these runs.

EXAMPLE 19 and TABLE 10 illustrate polymerization in the presence of a solid catalyst component and incompletely reacted starting materials (19(B1)) and in the presence of a solid catalyst component (19(B2)) which was allowed to remain in contact with incompletely reacted starting materials for a prolonged period prior to washing. As can be seen from the table, the activity and stereospecificity of 19(B1) was inferior. Subsequent washing led to significant improvements in stereospecificity and activity although the latter was still substantially below that of component 4(B), the preparation of which was identical to that of 19(B2) except for the prolonged contact with unreacted starting materials. Mechanical activation of the components prepared in EXAMPLE 19 was omitted due to the poor performance of the unactivated components (19(B1) and 19(B2)).

EXAMPLE 20 illustrates a catalyst component prepared according to this invention except that a magnesium halide (MgCl$_2$) was substituted for the magnesium alcoholate pretreatment component. As can be seen from TABLE 10, the activity of catalyst component 20(B) was fair, but stereospecificity did not even approach that of the invented catalyst components. Mechanical activation was omitted in EXAMPLE 20 due to the poor performance of component 20(B).

EXAMPLE 21

A series of bulk polymerizations were carried out in the presence of catalyst component 4(C) according to the following procedure. 0.044 gram 4(C) (unless otherwise indicated), and sufficient TEA, ethyl benzoate (EB), and ethyl anisate (EA) to give the specified molar ratios were combined in a nitrogen filled dry box and then flushed into a 2 liter Parr reactor in 300 cc. propylene. Another 1000 cc. propylene were charged to the reactor and polymerization conducted at 140° F. (60° C.) for 2 hours (unless otherwise indicated). Polymerization then was terminated by cooling, venting, and opening the reactor. After drying in an oven, the resulting solid polypropylene was weighed, extractables (EXT) were determined as in EXAMPLE 1, and product bulk density (BD) was determined by weighing a polymer sample of known volume. Results are reported in TABLE 11.

TABLE 11

| RUN NO. | MOLAR RATIO TEA/Ti/EB/EA | YIELD[1] | EXT[2] | BD[3] |
|---|---|---|---|---|
| 1 | 27/1.0/1.1/1.1 | 9164 | 10.7 | 15.9 |
| 2 | 27/1.0/1.1/2.5 | 7570 | 8.8 | 14.8 |
| 3 | 27/1.0/1.8/1.8 | 7070 | 9.9 | 16.1 |
| 4 | 27/1.0/1.8/3.6 | 5516 | 5.9 | 14.5 |
| 5 | 27/1.0/3.6/3.6 | 4914 | 4.7 | 18.3 |
| 6[4] | 27/1.0/1.8/1.8 | 6152 | 7.9 | 15.9 |
| 7[5] | 27/1.0/1.8/1.8 | 6141 | 6.7 | 14.0 |
| 8[6] | 27/1.0/1.8/1.8 | 6627 | 6.9 | 17.1 |
| 9[7] | 57/1.0/7.0/3.1 | 2313 | 4.0 | 16.4 |
| 10[8] | 57/1.0/7.0/3.1 | 8032 | 9.1 | 17.1 |
| 11[7] | 72/1.0/7.0/3.1 | 8645 | 15.5 | 13.9 |
| 12[8] | 72/1.0/7.0/3.1 | 10266 | 11.1 | 16.4 |
| 13[7] | 115/1.0/10.5/4.6 | 5581 | 6.2 | 19.4 |
| 14[9] | 115/1.0/10.5/4.6 | 12219 | 42.9 | — |
| 15[10] | 241/1.0/22/11 | 5395 | 9.8 | 16.4 |
| 16[11] | 301/1.0/29/13 | 5703 | 8.7 | 17.9 |

[1]Grams solid polypropylene per gram titanium
[2]Wt. %
[3]Lbs./ft.$^3$
[4]Product melt flow rate (MFR) was 0.28 g./10 min. as determined by testing a 6 g. sample which had been dry-blended with 0.15 wt. % BHT on a Thermodyne Flowrater (manufactured by Shell Development).
[5]Polymerization was conducted in the presence of 1 p.s.i.g. hydrogen. Product MFR was 0.84 g./10 min.
[6]Polymerization was conducted in the presence of 2 p.s.i.g. hydrogen. Product MFR was 1.3 g./10 min.
[7]0.031 g. 4(C) used, catalyst added to reactor at 140° F. (60° C.).
[8]Same as [7] except catalyst added at ambient temperature.
[9]Same as [7] except that catalyst mix was aged for 3 hours prior to use.
[10]Same as [7] except 0.065 g. 4(C) used and polymerization time was 1 hour.
[11]Same as [10] except polymerization time was 1.33 hours.

EXAMPLE 21 and TABLE 11 illustrate the use of the invented catalysts in a bulk polymerization process and on a larger scale than the pressure bottle runs of EXAMPLES 1-20. From the table it can be seen that good results were achieved using a wide range of TEA to supported component (Ti) to crystallinity promoter concentrations. Runs 6-8 also illustrate that the invented catalyst components are sensitive to hydrogen such that products having a wide range of flow properties can be prepared. In general, extractables levels in runs 1-16 were 2 to 3 times the solubles plus extractables levels achieved in the better pressure bottle runs of EXAMPLES 1-15. The high extractables level in run 14 apparently resulted from aging of the catalyst mix. In general, product bulk densities were sufficiently high as to ensure ease of handling and processing.

EXAMPLE 22

Step (A) of EXAMPLE 4 was repeated except that (1) the magnesium ethoxide was replaced with 12 g. (0.057 mole) magnesium phenoxide which had been prepared by refluxing magnesium methoxide and purified phenol in heptane in a 2:1 molar ratio with removal of methanol by distillation; (2) the solid reaction product was washed twice with 100 ml. portions of dry n-hexane instead of 125 ml. portions; and (3) the pretreatment product was suspended in 200 ml. n-nonane.

Step (B) of EXAMPLE 4 was repeated except that 100 ml. titanium trichloride and a solution of 2 ml. ethyl benzoate in 25 ml. n-nonane were used.

Step (C) of EXAMPLE 4 was repeated and samples of the result containing 0.050 g. catalyst component were employed according to the procedure of EXAMPLE 4 Step (D). Results are reported in TABLE 12.

TABLE 12

| RUN NO. | CRYSTALLINITY PROMOTER (ml.) | ACTIVITY[1] | SOLUBLES (WT. %) |
|---|---|---|---|
| 1 | None | 500 | 32 |
| 2 | 0.008 MPT[2] | 433 | 5.0 |
| 3 | 0.010 MPT | 421 | 6.3 |
| 4 | 0.012 MPT | 360 | 4.8 |
| 5 | 0.008 MPI + 0.004 TMP[3] | 556 | 5.2 |
| 6 | 0.008 MPT + 0.004 EA[4] | 272 | 4.5 |

[1]grams solid polypropylene per gram catalyst component per hour.
[2]methyl p-toluate; used in the form of a solution of 2.26 g. MPT per 10 ml. hexane.
[3]2,2,6,6-tetramethylpiperidine.
[4]ethyl p-anisate Elemental analysis of the catalyst component prepared in EXAMPLE 22 showed 5.4 wt.% titanium, 51 wt.% chlorine and 15 wt.% magnesium.

EXAMPLE 23

Steps (A) and (B) of EXAMPLE 8 were repeated except that in (B) the temperature was 135°-140° C. and after cooling, supernatant was removed and the remaining solid was contacted for 5 minutes with 65 ml. 100% titanium tetrachloride at 120° C. with stirring. Solids then were allowed to settle, supernatant was decanted and the remaining solid was washed four times with 150 ml. portions of n-hexane. Samples of the solid remaining after the final n-hexane wash, identified as 23(B), were employed in polymerization as described hereinbelow.

The remainder of the solid catalyst component and 90 stainless steel balls having a diameter of 10 mm. were placed in a Roalox, burundum-fortified porcelain mill jar (manufactured by A. Daigger Company) having a capacity of ¼ quart (about 280 ml.) and milled in a rotary ball mill (manufactured by Paul O. Abbe, Inc., motor speed=1725 rpm) for 25 hours at ambient temperature under an atmosphere of dry nitrogen. The solid then was removed from the mill jar, separated from the steel balls, and suspended in 200 ml. dry n-hexane. Aliquots of the suspension, identified as 23(C) were employed in the polymerization of propylene as described hereinbelow.

Propylene polymerizations were conducted according to the following procedure. Amounts of catalyst component (0.050 g. 23(B) and an amount of suspension containing 0.051 g. 23C)), TEA (0.15 ml. 25 wt.% in dry n-hexane unless otherwise indicated), and in some runs, various crystallinity promoters were added to 200 ml. dry n-hexane in a 450 ml. pressure bottle equipped with magnetic stirrer after which the bottle was sealed and placed in a 60° C. oil bath. Polymerization grade propylene then was charged to the bottle at 50 psig. (about 3.52 kg/cm$^2$) and the contents of the bottle were stirred. After 1 hour, unless otherwise indicated, the bottle was cooled, opened, and the contents filtered. The resulting white solid polypropylene was dried at ambient temperature and weighed. Hexane solubles (SOL) were determined by evaporation of the filtrate to dryness and weighing of the residue. Hexane extractables (EXT) were determined by Soxhlet extraction of a weighed sample of the solid polypropylene with boiling n-hexane. Results are reported in TABLE 13. In the table, the following abbreviations are used to identify crystallinity promoters and amounts thereof:

EB: ethyl benzoate (0.006 ml.);
EA: ethyl p-anisate (0.003 ml. unless otherwise indicated);
EP: ethyl pivalate (0.003 ml.);
TMP: 2,2,6,6-tetramethylpiperidine (0.003 ml. unless otherwise indicated);
EBB: ethyl p-bromobenzoate (0.003 ml.);
AP: 2-acetylpyridine (0.003 ml.);
MPT: methyl p-toluate used as solution of 2.26 g. MPT per 10 ml. hexane (amounts of MPT shown in table)
BTS: bis-(tri-n-butyltin)sulfide (amounts (ml.) shown in table).

TABLE 13

| CATALYST COMPONENT | CRYSTALLINITY PROMOTER | ACT[1] | SOL (wt. %) | EXT (wt. %) |
|---|---|---|---|---|
| 23(B)* | None | 1328 | 19.6 | ND[2] |
| 23(C)** | None | 1171 | 22.0 | 5.0 |
| 23(B) | EB + EA | 860 | 1.4 | ND |
| 23(C) | EB + EA | 732 | 1.0 | 2.0 |
| 23(C) | EB + EA | 793 | 1.0 | 2.3 |
| 23(B) | EB + EP | 847 | 2.5 | ND |
| 23(C) | EB + EP | 745 | 1.2 | 2.6 |
| 23(B)*** | EB + TMP | 760 | 2.6 | ND |
| 23(C) | EB + TMP | 1073 | 1.3 | 3.1 |
| 23(C) | EB + TMP | 1034 | 1.5 | 2.4 |
| 23(B) | EB + EBB | 583 | 1.0 | ND |
| 23(C) | EB + EBB | 447 | 0.9 | 1.6 |
| 23(B)**** | EB + AP | 670 | 1.9 | ND |
| 23(C) | EB + AP | 699 | 1.1 | 2.1 |
| 23(C) | EB + AP | 786 | 1.4 | 1.9 |
| 23(C)** | 0.017 MPT + 0.001 EB | 1171 | 2.1 | 2.7 |
| 23(C) | 0.023 MPT + 0.002 EA | 1059 | 1.3 | 2.4 |
| 23(C) | 0.034 MPT + EA | 712 | 0.7 | 1.6 |
| 23(C) | 0.017 MPT + 0.001 BTS | 1195 | 2.7 | 4.0 |
| 23(C) | 0.023 MPT + 0.002 BTS | 1294 | 3.6 | 3.7 |
| 23(C) | 0.034 MPT + 0.003 BTS | 1126 | 1.7 | 3.3 |
| 23(C) | 0.034 MPT + EA | 807 | 0.7 | 1.7 |
| 23(C) | 0.045 MPT + 0.002 EA | 722 | 0.7 | 2.8 |
| 23(C) | 0.057 MPT | 772 | 0.8 | 1.3 |

[1]ACT is activity in grams solid polypropylene per gram catalyst component per hour.
[2]ND stands for not determined.
*30 minute run, 0.10 ml. TEA used.
**0.10 ml. TEA used.
***40 minute run.
****45 minute run.

EXAMPLE 24

The procedure of EXAMPLE 23 was repeated. In each polymerization 0.050 g. catalyst component was used. Results are reported in TABLE 14.

TABLE 14

| CATALYST COMPONENT | CRYSTALLINITY PROMOTER (ml.)[1] | ACTIVITY[2] | SOLUBLES (wt. %) |
|---|---|---|---|
| 24(B)* | None | 1587 | 16.6 |
| 24(C)** | None | 1432 | 19.4 |
| 24(B)*** | EB + EA | 1097 | 2.2 |
| 24(C) | EB + EA | 816 | 1.3 |
| 24(B)**** | EB + EP | 1272 | 3.0 |
| 23(C) | EB + EP | 820 | 1.5 |
| 24(B)**** | EB + TMP | 1303 | 3.1 |
| 24(C) | EB + TMP | 1001 | 1.3 |
| 24(B) | EB + EBB | 857 | 1.6 |
| 24(C) | EB + EBB | 623 | 1.0 |
| 24(B)***** | EB + AP | 1217 | 2.8 |
| 24(C) | EB + AP | 657 | 1.1 |
| 24(C)** | 0.017 MPT + 0.001 EA | 973 | 1.5 |
| 24(C) | 0.023 MPT + 0.002 EA | 1017 | 1.4 |
| 24(C) | 0.034 MPT + EA | 689 | 0.7 |
| 24(C)** | 0.017 MPT + 0.001 BTS | 1097 | 0.5 |
| 24(C) | 0.023 MPT + 0.002 BTS | 1161 | 2.5 |
| 24(C) | 0.034 MPT + 0.003 BTS | 1030 | 1.5 |

[1]For identification and amounts of crystallinity promoters see EXAMPLE 23.
[2]grams solid polypropylene per gram catalyst component per hour.
*25 minute run, 0.10 ml. TEA used.
**0.10 ml. TEA used.
***50 minute run.
****35 minute run.
*****40 minute run.

EXAMPLES 23 and 24 and TABLES 13 and 14 illustrate treatment with liquid Lewis acid according to the invention. Comparison of TABLES 13 and 14 with TABLE 6 reveals improved activity without significant adverse effects on activity as a result of the treatment. Comparison of TABLES 13 and 14 reveals that the effects of the treatment were reproducible.

EXAMPLE 25

The procedure of EXAMPLE 23 was repeated except that the titanium tetrachloride used to treat the solid reaction product was at ambient temperature (20°-25° C.) In polymerization runs 0.050 g. samples of catalyst component were used. Results are reported in TABLE 15. In the table, "SOL" stands for n-hexane solubles and "EXT" for n-hexane extractables.

TABLE 15

| CATALYST COMPONENT | CRYSTALLINITY PROMOTER (ml.)[1] | ACT[2] | SOL (wt. %) | EXT (wt. %) |
|---|---|---|---|---|
| 25(C)* | None | 1730 | 18.2 | 1.8 |
| 25(C) | EB + EA | 643 | 0.8 | 2.1 |
| 25(C) | EB + EP | 765 | 1.3 | 3.3 |
| 25(C) | EB + TMP | 1057 | 1.3 | 3.5 |
| 25(C) | EB + EBB | 265 | 0.4 | 1.4 |
| 25(C) | EB + AP | 276 | 0.5 | 1.3 |
| 25(C)** | 0.017 MPT + 0.001 EA | 318 | 0.2 | ND[3] |
| 25(C) | 0.023 MPT + 0.002 EA | 199 | 0.2 | ND |
| 25(C) | 0.034 MPT + EA | 129 | 0.2 | ND |
| 25(C)*** | 0.017 MPT + 0.001 BTS | 116 | 0.2 | ND |
| 25(C) | 0.023 MPT + 0.002 BTS | 238 | 0.1 | ND |
| 25(C) | 0.034 MPT + 0.003 BTS | 175 | 0.1 | ND |

[1]For identification and amounts of crystallinity promoters see EXAMPLE 23.
[2]ACT is activity in grams solid polypropylene per gram catalyst component per hour.
[3]ND stands for not determined.
*10 minute run, 0.10 ml. TEA used.
**25 minute run, 0.10 ml. TEA used.
***0.10 ml. TEA used.

EXAMPLE 26

The procedure of EXAMPLE 23 was repeated except that in each titanium tetrachloride treatment 75 ml. of 75 vol.% titanium tetrachloride in n-hexane was used. In polymerization runs 0.049 g. samples of catalyst component were used. Results are reported in TABLE 16.

TABLE 16

| CATALYST COMPONENT | CRYSTALLINITY PROMOTER (ml.)[1] | ACTIVITY[2] | SOLUBLES (wt. %) |
|---|---|---|---|
| 26(C)* | None | 1804 | 24.3 |
| 26(C) | EB + EA | 881 | 1.4 |
| 26(C) | EB + EP | 770 | 2.2 |
| 26(C) | EB + TMP | 1075 | 2.0 |
| 26(C) | EB + EBB | 510 | 1.0 |
| 26(C) | EB + AP | 761 | 1.7 |
| 26(C)** | 0.001 EA + 0.017 TMP | 1225 | 2.5 |
| 26(C) | 0.002 EA + 0.023 TMP | 1183 | 2.4 |
| 26(C) | 0.003 EA + 0.034 TMP | 1021 | 1.3 |
| 26(C)** | 0.001 BTS + 0.017 TMP | 1295 | 4.1 |
| 26(C) | 0.002 BTS + 0.023 TMP | 1124 | 4.6 |
| 26(C) | 0.003 BTS + 0.034 TMP | 1096 | 4.2 |

[1] For identification and amounts of crystallinity promoters see EXAMPLE 23.
[2] grams solid polypropylene per gram catalyst component per hour.
*10 minute run, 0.10 ml. TEA used.
**0.10 ml. TEA used.

Examples 25 and 26 illustrate the effects of varying conditions in the Lewis acid treatment step. As can be seen from EXAMPLE 25 and TABLE 15, the use of cold $TiCl_4$ (20°–25° C.) gave good results as did the use of diluted $TiCl_4$ as shown in EXAMPLE 26 and TABLE 16.

EXAMPLE 27

The procedure of EXAMPLE 23 was repeated except that in the Lewis acid treatment 65 ml. 100% silicon tetrachloride at 70° C. were substituted for titanium tetrachloride. In polymerization runs 0.049 g. samples of catalyst component were used. Results are reported in TABLE 17.

TABLE 17

| CATALYST COMPONENT | CRYSTALLINITY PROMOTER[1] | ACTIVITY[2] | SOLUBLES (wt. %) |
|---|---|---|---|
| 27(C) | EB + EA | 689 | 0.9 |
| 27(C)* | EB + EP | 1127 | 1.7 |
| 27(C)** | EB + TMP | 1048 | 1.3 |
| 27(C) | EB + EBB | 609 | 1.0 |
| 27(C) | EB + AP | 690 | 1.3 |

[1] For identification and amounts of crystallinity promoters see EXAMPLE 23.
[2] grams solid polypropylene per gram catalyst component per hour.
*20 minute run.
**45 minute run.

EXAMPLE 27 and TABLE 27 illustrate Lewis acid treatment using $SiCl_4$ as the Lewis acid. As shown in the table, results with $SiCl_4$ were generally comparable to those with $TiCl_4$.

We claim:

1. A catalyst for the polymerization of alpha-olefins of at least 3 carbon atoms comprising (A) an organoaluminum component, and (B) a solid component which is the reaction product of components comprising
   (1) at least one titanium(IV) halide or haloalcoholate;
   (2) at least one organic electron donor containing at least one of oxygen, nitrogen, sulfur and phosphorus; and
   (3) at least one hydrocarbon-insoluble, magnesium-containing pretreatment product of components comprising
      (a) at least one magnesium alcoholate; and
      (b) at least one Group II or IIIA metal alkyl;
   wherein the atomic ratio of metal in (3)(b) to metal in (3)(a) ranges from about 0.001:1 to about 1:1, the atomic ratio of titanium in (1) to metal in (3)(a) is at least about 0.5:1, and (2) is employed in an amount ranging from about 0.001 to about 1 mole per gram-atom of titanium contained in (1).

2. The catalyst of claim 1 wherein component (2) comprises a $C_{1-6}$ alkyl ester of an aromatic monocarboxylic acid or of an aromatic monocarboxylic acid substituted with at least one of halogen, hydroxyl, oxo, alkyl, alkoxy, aryl or aryloxy.

3. The catalyst of claim 1 wherein component (3)(b) comprises a compound of the formula $MR^3{}_m$ wherein M is aluminum, magnesium, or zinc, each $R^3$ is independently an alkyl radical of 1 to about 20 carbon atoms, and m corresponds to the valence of M.

4. The catalyst of claim 1 wherein component (3)(a) comprises a compound of the formula $Mg(OR^1)_n(OR^2)_{2-n}$, wherein $R^1$ and $R^2$ are identical or different hydrocarbyl radicals of 1 to about 20 carbon atoms, and n ranges from 0 to 2.

5. The catalyst of claim 1 wherein the solid component (B) is mechanically activated.

6. The catalyst of claim 1 wherein component (3) is prepared in the presence of at least one alpha-olefin.

7. The catalyst of claim 1 further characterized in that the solid component (B) is treated with at least one liquid Lewis acid having a high enough Lewis acidity to remove impurities from the surface of said solid component.

8. The catalyst of claim 7 further characterized in that said Lewis acid-treated solid is mechanically activated.

9. The catalyst of claim 1 wherein component (1) comprises titanium tetrachloride.

10. The catalyst of claim 9 wherein component (2) comprises an alkyl ester of benzoic acid or a halobenzoic acid, said alkyl radical containing 1 to about 6 carbon atoms.

11. The catalyst of claim 10 wherein component (3)(b) comprises a compound of the formula $MR^3{}_m$ wherein M is aluminum, magnesium, or zinc, each $R^3$ is independently an alkyl radical of 1 to about 20 carbon atoms, and m corresponds to the valence of M.

12. The catalyst of claim 11 wherein component (3)(a) comprises a compound of the formula $Mg(OR^1)_n(OR^2)_{2-n}$ wherein $R^1$ and $R^2$ are identical or different hydrocarbyl radicals of 1 to about 20 carbon atoms and n ranges from 0 to 2.

13. The catalyst of claim 12 further characterized in that said solid component (B) is treated with at least one Lewis acid selected from the Group III–V metal halides which are in the liquid state at temperatures up to about 170° C.

14. The catalyst of claim 13 wherein component (3)(b) comprises a trialkylaluminum containing 1 to about 6 carbon atoms per alkyl radical.

15. The catalyst of claim 14 wherein component (2) comprises ethyl benzoate.

16. The catalyst of claim 15 wherein component (3)(b) comprises triethylaluminum.

17. The catalyst of claim 16 wherein component (3)(a) comprises a compound of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms.

18. The catalyst of claim 17 further characterized in that said solid component (B) is ball milled.

19. The catalyst of claim 17 further characterized in that the solid component (B) is treated with liquid Lewis acid selected from the group consisting of titanium tetrachloride and silicon tetrachloride at a temperature ranging from about 0° to about 170° C.

20. The catalyst of claim 19 further characterized in that said solid component (B) is ball milled subsequent to treatment with said Lewis acid.

21. The catalyst of claim 1 wherein the organoaluminum compound (A) comprises a trialkylaluminum containing 2 to about 12 carbon atoms per alkyl radical.

22. The catalyst of claim 21 further characterized in that said catalyst comprises at least one crystallinity promoter.

23. The catalyst of claim 22 wherein the organoaluminum compound (A) comprises triethylaluminum.

24. The catalyst of claim 1 wherein the components in (3) comprise (c) at least one pretreatment modifier selected from the group consisting of mineral acids and anhydrides of sulfur, organometallic chalcogenide derivatives of hydrogen sulfide in which each hydrogen is replaced by an organosilicon, organogermanium or organotin group wherein the organic radicals are selected from the group consisting of phenyl, alkyl-substituted phenyl, phenyl-substituted alkyl and alkyl radicals, said alkyl radicals containing 1 to about 6 carbon atoms, organic acids containing 1 to about 20 carbon atoms and 1 to about 4 carboxyl groups and $C_1$ to about $C_{12}$ alkyl and haloalkyl and $C_6$ to about $C_{10}$ aryl and haloaryl esters of said organic acids.

25. The catalyst of claim 24 wherein component (2) comprises an alkyl ester of benzoic acid or a halobenzoic acid, said alkyl radical containing 1 to about 6 carbon atoms.

26. The catalyst of claim 24 wherein component (3)(b) comprises a compound of the formula $MR^3{}_m$ wherein M is aluminum, magnesium, or zinc, each $R^3$ is independently an alkyl radical of 1 to about 20 carbon atoms, and m corresponds to the valence of M.

27. The catalyst of claim 24 wherein component (3)(a) comprises a compound of the formula $Mg(OR^1)_n(OR^2)_{2-n}$ wherein $R^1$ and $R^2$ are identical or different hydrocarbyl radicals of 1 to about 20 carbon atoms and n ranges from 0 to 2.

28. The catalyst of claim 24 wherein the solid component (B) is mechanically activated.

29. The catalyst of claim 24 further characterized in that the solid component (B) is treated with at least one liquid Lewis acid having a high enough Lewis acidity to remove impurities from the surface of said solid component.

30. The catalyst of claim 29 further characterized in that said Lewis acid-treated solid is mechanically activated.

31. The catalyst of claim 24 wherein component (1) comprises titanium tetrachloride.

32. The catalyst of claim 31 wherein component (2) comprises an alkyl ester of benzoic acid or a halobenzoic acid, said alkyl radical containing 1 to about 6 carbon atoms.

33. The catalyst of claim 32 wherein component (3)(b) comprises a compound of the formula $MR^3{}_m$ wherein M is aluminum, magnesium, or zinc, each $R^3$ is independently an alkyl radical of 1 to about 20 carbon atoms, and m corresponds to the valence of M.

34. The catalyst of claim 33 wherein component (3)(c) comprises sulfuric acid, fuming sulfuric acid, chlorosulfonic acid, hydrogen sulfide, benzoic acid, a $C_1$ to about $C_6$ alkyl benzoate or halobenzoate, or a mixture thereof.

35. The catalyst of claim 34 wherein component (3)(a) comprises a compound of the formula $Mg(OR^1)_n(OR^2)_{2-n}$ wherein $R^1$ and $R^2$ are identical or different hydrocarbyl radicals of 1 to about 20 carbon atoms, and n ranges from 0 to 2.

36. The catalyst of claim 35 further characterized in that said solid component (B) is treated with at least one Lewis acid selected from the Group III-V metal halides which are in the liquid state at temperatures up to about 170° C.

37. The catalyst of claim 36 wherein component (2) comprises ethyl benzoate.

38. The catalyst of claim 37 wherein component (3)(b) comprises a trialkylaluminum containing 1 to about 6 carbon atoms per alkyl radical.

39. The catalyst of claim 38 wherein component (3)(a) comprises a compound of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms.

40. The catalyst of claim 39 wherein component (3)(c) comprises chlorosulfonic acid and methyl benzoate.

41. The catalyst of claim 40 wherein component (3)(b) comprises triethylaluminum.

42. The catalyst of claim 41 wherein component (3) is prepared in the presence of at least one alpha-olefin.

43. The catalyst of claim 42 wherein the alphaolefin is propylene.

44. The catalyst of claim 42 wherein the solid component (B) is ball milled.

45. The catalyst of claim 42 further characterized in that the solid component (B) is treated with liquid Lewis acid selected from the group consisting of titanium tetrachloride and silicon tetrachloride at a temperature ranging from about 0° to about 170° C.

46. The catalyst of claim 45 further characterized in that said solid component (B) is ball milled subsequent to treatment with said Lewis acid.

47. The catalyst of claim 41 further characterized in that said solid component (B) is ball milled.

48. The catalyst of claim 41 further characterized in that the solid component (B) is treated with liquid Lewis acid selected from the group consisting of titanium tetrachloride and silicon tetrachloride at a temperature ranging from about 0° to about 170° C.

49. The catalyst of claim 48 further characterized in that said solid component (B) is ball milled subsequent to treatment with said Lewis acid.

50. The catalyst of claim 24 wherein component (3) is prepared in the presence of at least one alpha-olefin.

51. The catalyst of claim 50 wherein the alpha-olefin is propylene.

52. The catalyst of claim 24 wherein the organoaluminum compound (A) comprises a trialkylaluminum containing 2 to about 12 carbon atoms per alkyl radical.

53. The catalyst of claim 52 further characterized in that said catalyst comprises at least one crystallinity promoter.

54. The catalyst of claim 53 wherein the organoaluminum compound (A) comprises triethylaluminum.

55. A catalyst for the stereospecific polymerization of alpha-olefins of at least 3 carbon atoms comprising (A) triethylaluminum, triisobutylaluminum or a mixture thereof and (B) a solid component which is the reaction product of components comprising
(1) titanium tetrachloride;

(2) ethyl benzoate; and
(3) a hydrocarbon-insoluble, magnesium-containing pretreatment product of components comprising
  (a) magnesium ethoxide;
  (b) triethylaluminum;
  (c) chlorosulfonic acid; and
  (d) methyl benzoate;
wherein the atomic ratio of aluminum in (3)(b) to magnesium in (3)(a) ranges from about 0.005:1 to about 0.5:1, the molar ratio of component (3)(c) plus (3)(d) to component (3)(b) ranges from about 0.001:1 to about 2:1, the atomic ratio of titanium in component (1) to magnesium in component (3)(a) ranges from about 0.5:1 to about 20:1, and the ratio of component (2) to titanium in component (1) ranges from about 0.005 to about 0.6 mole per gram-atom.

56. The catalyst of claim 55 further characterized in that component (B) is prepared in the presence of propylene.

57. The catalyst of claim 55 further characterized in that the solid component (B) is ball milled.

58. The catalyst of claim 55 further characterized in that the solid component (B) is treated with titanium tetrachloride at 20° to about 135° C.

59. The catalyst of claim 58 further characterized in that the solid component (B) is ball milled subsequent to treatment with said titanium tetrachloride.

60. The catalyst of claim 59 further characterized in that said catalyst comprises at least one crystallinity promoter.

61. The catalyst of claim 55 further characterized in that said catalyst comprises at least one crystallinity promoter.

62. A process for preparing a catalyst component useful in the stereospecific polymerization of alpha-olefins having at least 3 carbon atoms comprising
  (A) contacting components comprising (1) at least one magnesium alcoholate, and (2) at least one Group II or IIIA metal alkyl in amounts such that the atomic ratio of metal in (2) to metal in (1) ranges from about 0.001:1 to about 1:1;
  (B) removing unreacted Group II or IIIA metal component from the product of (A) to form a solid, hydrocarbon-insoluble, magnesium-containing pretreatment product; and
  (C) contacting said pretreatment product with components comprising at least one titanium(IV) halide or haloalcoholate and at least one organic electron donor containing at least one of oxygen, nitrogen, sulfur and phosphorus, in amounts such that the atomic ratio of titanium to metal in (A)(1) is at least about 0.5:1 and the ratio of organic electron donor to titanium ranges from about 0.001 to about 1 mole per gram-atom, to form a solid catalyst component.

63. The process of claim 62 further characterized in that (A) is conducted in the presence of at least one alpha-olefin.

64. The process of claim 62 further characterized in that said solid catalyst component is contacted with at least one liquid Lewis acid having a high enough Lewis acidity to remove impurities from the surface of said solid.

65. The process of claim 64 further characterized in that said solid is mechanically activated subsequent to treatment with said Lewis acid.

66. The process of claim 62 further characterized in that said solid catalyst component is mechanically activated.

67. The process of claim 62 further characterized in that the components in (A) further comprise (3) at least one modifier selected from the group consisting of mineral acids and anhydrides of sulfur, organometallic chalcogenide derivatives of hydrogen sulfide in which each hydrogen is replaced by an organosilicon, organogermanium or organotin group wherein the organic radicals are selected from the group consisting of phenyl, alkyl-substituted phenyl, phenyl-substituted alkyl and alkyl radicals, said alkyl radicals containing 1 to about 6 carbon atoms, organic acids containing 1 to about 20 carbon atoms and 1 to about 4 carboxyl groups and $C_1$ to about $C_{12}$ alkyl and haloalkyl and $C_6$ to about $C_{10}$ aryl and haloaryl esters of said organic acids.

68. The process of claim 67 wherein (A) is conducted in the presence of at least one alpha-olefin.

69. The process of claim 67 further characterized in that said solid catalyst component is contacted with at least one liquid Lewis acid having a high enough Lewis acidity to remove impurities from the surface of said solid.

70. The process of claim 69 further characterized in that said solid is mechanically activated subsequent to treatment with said Lewis acid.

71. The process of claim 67 further characterized in that said solid catalyst component is mechanically activated.

72. The process of claim 67 wherein component (1) comprises magnesium ethoxide, component (2) comprises triethylaluminum, the titanium(IV) component comprises titanium tetrachloride, the organic electron donor component comprises ethyl benzoate, and the modifier component (3) comprises chlorosulfonic acid and methyl benzoate.

73. The process of claim 72 wherein the solid catalyst component is contacted with titanium tetrachloride at about 20° to about 135° C.

74. The process of claim 73 wherein the solid catalyst component is ball milled subsequent to treatment with said titanium tetrachloride.

75. The process of claim 72 wherein the solid catalyst component is ball milled.

76. The process of claim 72 wherein (A) is conducted in the presence of propylene.

77. The process of claim 76 wherein the solid catalyst component is contacted with titanium tetrachloride at about 20° to about 135° C.

78. The process of claim 77 wherein the solid catalyst component is ball milled subsequent to treatment with said titanium tetrachloride.

79. The process of claim 76 wherein the solid catalyst component is ball milled.

* * * * *

UNITED STATES PATENT OFFICE
CERTIFICATE OF CORRECTION

Patent No. 4,277,370     Dated July 7, 1981

Inventor(s) NICHOLAS M. KARAYANNIS and JOHN S. SKRYANTZ

It is certified that error appears in the above-identified patent and that said Letters Patent are hereby corrected as shown below:

Patent

| Column | Line | |
|---|---|---|
| 10 | 67-68 | "hydrocarbon-in-soluble" should be --hydrocarbon-insoluble--. |
| 15 | 50 | "Optimum polymerization" should be --Optimum polymerization performance--. |
| 16 | 13 | "1 to 20" should be --1 to about 20--. |

Signed and Sealed this

Fourteenth Day of December 1982

[SEAL]

Attest:

GERALD J. MOSSINGHOFF

Attesting Officer     Commissioner of Patents and Trademarks